US012794650B2

(12) United States Patent
Zhu et al.

(10) Patent No.: US 12,794,650 B2
(45) Date of Patent: Nov. 10, 2026

(54) UE-INITIATED BEAM OPERATION

(71) Applicant: Samsung Electronics Co., Ltd., Suwon-si (KR)

(72) Inventors: Dalin Zhu, Allen, TX (US); Md. Saifur Rahman, Plano, TX (US); Emad Nader Farag, Flanders, NJ (US); Gilwon Lee, McKinney, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 18/396,535

(22) Filed: Dec. 26, 2023

(65) Prior Publication Data

US 2024/0235794 A1 Jul. 11, 2024

Related U.S. Application Data

(60) Provisional application No. 63/437,906, filed on Jan. 9, 2023.

(51) Int. Cl.
*H04L 5/00* (2006.01)
*H04W 72/20* (2023.01)

(52) U.S. Cl.
CPC ........... *H04L 5/0091* (2013.01); *H04W 72/20* (2023.01)

(58) Field of Classification Search
CPC ... H04B 7/0695; H04L 1/1854; H04L 1/1896; H04L 5/0023; H04L 5/0053; H04L 5/006; H04L 5/0091; H04W 72/0446; H04W 72/046; H04W 72/1263; H04W 72/20; H04W 72/21; H04W 72/23
See application file for complete search history.

(56) References Cited

U.S. PATENT DOCUMENTS

| | | | | |
|---|---|---|---|---|
| 2019/0296956 | A1* | 9/2019 | John Wilson | H04W 28/20 |
| 2022/0007299 | A1 | 1/2022 | Rahman | |
| 2022/0078807 | A1 | 3/2022 | Sun et al. | |
| 2022/0330220 | A1 | 10/2022 | Farag | |
| 2022/0353869 | A1 | 11/2022 | Yi et al. | |
| 2023/0171771 | A1* | 6/2023 | Guo | H04L 5/0094 370/329 |

(Continued)

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

(Continued)

*Primary Examiner* — Thomas R Cairns
*Assistant Examiner* — Kai Chang

(57) ABSTRACT

Methods and apparatus for a user equipment (UE)-initiated beam operation. A method performed by a UE includes receiving a configuration related to (i) a time window and (ii) a transmission configuration indication (TCI) state operation mode; receiving one or more first TCI states; and determining, based on the configuration and the one or more first TCI states, one or more second TCI states, from the one or more first TCI states, to apply for a channel. The method further includes transmitting an indicator indicating the one or more second TCI states and the channel; receiving an acknowledgement for the indicator; and identifying a reception time of the acknowledgement.

20 Claims, 7 Drawing Sheets

(56) References Cited

U.S. PATENT DOCUMENTS

| | | | | |
|---|---|---|---|---|
| 2023/0209538 A1* | 6/2023 | Cirik | H04W 72/231 | |
| | | | 370/329 | |
| 2023/0216565 A1* | 7/2023 | Kwak | H04B 7/0696 | |
| | | | 375/267 | |
| 2023/0239884 A1* | 7/2023 | Khoshnevisan | H04W 72/23 | |
| | | | 370/329 | |
| 2023/0396375 A1* | 12/2023 | Muruganathan | H04L 5/0091 | |
| 2024/0283575 A1* | 8/2024 | Zhang | H04L 1/1854 | |
| 2025/0294575 A1* | 9/2025 | Park | H04L 1/1861 | |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion issued Apr. 5, 2024 regarding International Application No. PCT/KR2024/000407, 6 pages.
CATT, "Discussion on unified TCI framework extension for multi-TRP operation", 3GPP TSG-RAN WG1 #111, R1-2211167, Nov. 2022, 12 pages.
CEWiT, "Discussion on Unified TCI framework extension for multi-TRP", 3GPP TSG RAN WG1 Meeting #111, R1-2212420, Nov. 2022, 6 pages.
Sharp, "Unified TCI framework extension for multi-TRP", 3GPP TSG RAN WG1 #111, R1-2211886, Nov. 2022, 16 pages.
Supplementary European Search Report dated Feb. 6, 2026, in connection with European Patent Application No. 24741671.2, 11 pages.

* cited by examiner

UE-INITIATED BEAM OPERATION

CROSS-REFERENCE TO RELATED AND CLAIM OF PRIORITY

The present application claims priority under 35 U.S.C. § 119(e) to U.S. Provisional Patent Application No. 63/437,906 filed on Jan. 9, 2023, which is hereby incorporated by reference in its entirety.

TECHNICAL FIELD

The present disclosure relates generally to wireless communication systems and, more specifically, the present disclosure relates to methods and apparatus for a user equipment (UE)-initiated beam operation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to a UE-initiated beam operation.

In one embodiment, a user equipment (UE) is provided. The UE includes a transceiver configured to receive a configuration related to (i) a time window and (ii) a transmission configuration indication (TCI) state operation mode; and receive one or more first TCI states. The UE further includes a processor operably coupled to the transceiver. The processor is configured to determine, based on the configuration and the one or more first TCI states, one or more second TCI states, from the one or more first TCI states, to apply for a channel. The transceiver is further configured to transmit an indicator indicating the one or more second TCI states and the channel and receive an acknowledgement for the indicator. The processor is further configured to identify a reception time of the acknowledgement.

In another embodiment, a base station (BS) is provided. The BS includes a processor and a transceiver operably coupled to the processor. The transceiver is configured to transmit a configuration related to (i) a time window and (ii) a TCI state operation mode; transmit one or more first TCI states; receive an indicator indicating (i) one or more second TCI states, from the one or more first TCI states, to apply for a channel and (ii) the channel; and transmit an acknowledgement for the indicator.

In yet another embodiment, a method performed by a user equipment (UE) is provided. The method includes receiving a configuration related to (i) a time window and (ii) a TCI state operation mode; receiving one or more first TCI states; and determining, based on the configuration and the one or more first TCI states, one or more second TCI states, from the one or more first TCI states, to apply for a channel. The method further includes transmitting an indicator indicating the one or more second TCI states and the channel; receiving an acknowledgement for the indicator; and identifying a reception time of the acknowledgement.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-7, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" [5] 3GPP TS 38.321 v16.1.0, "NR; Medium Access Control (MAC) protocol specification;" and [6] 3GPP TS 38.331 v16.1.0, "NR; Radio Resource Control (RRC) Protocol Specification."

Figure 1:
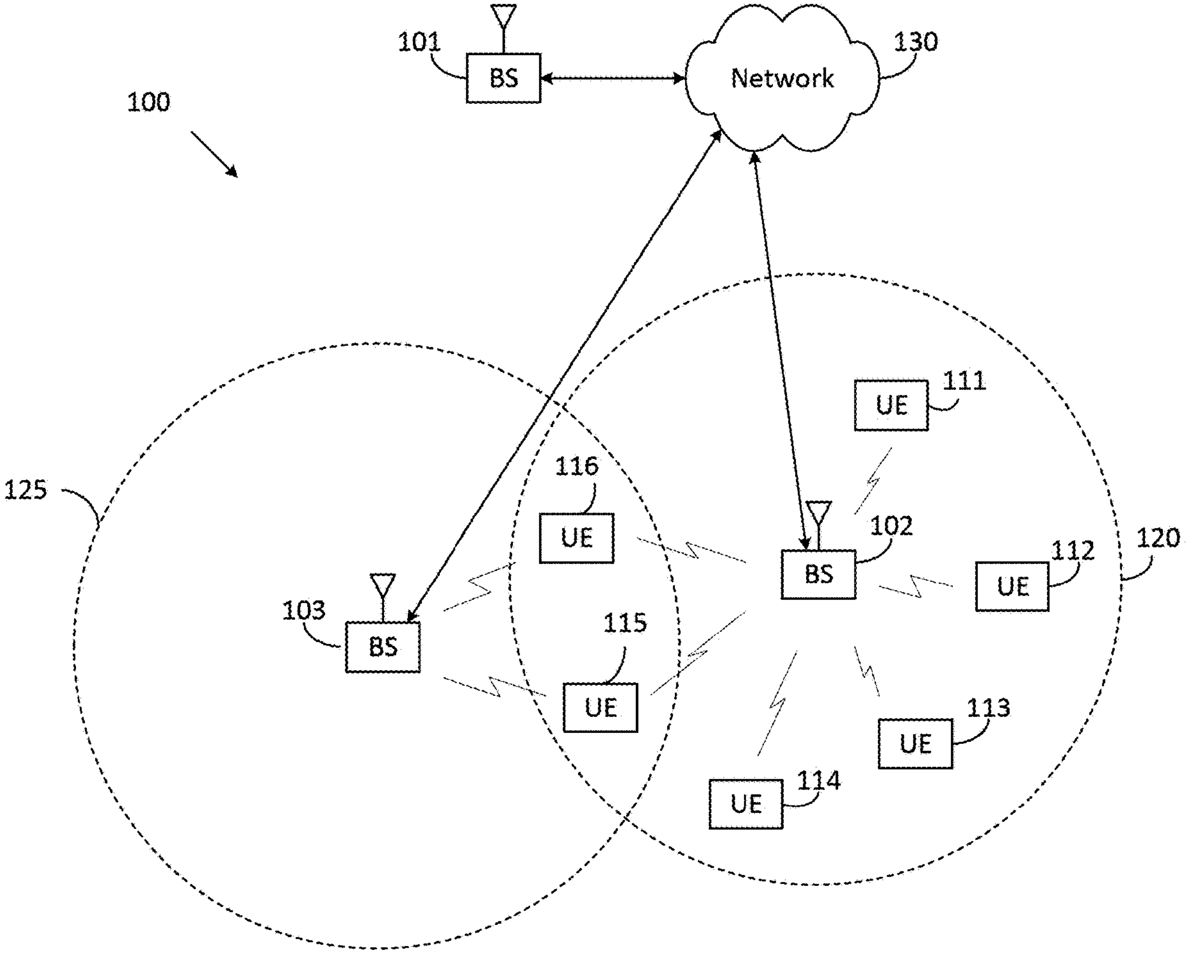
FIG. 1 illustrates an example wireless network according to embodiments of the present disclosure.
Figure 2:
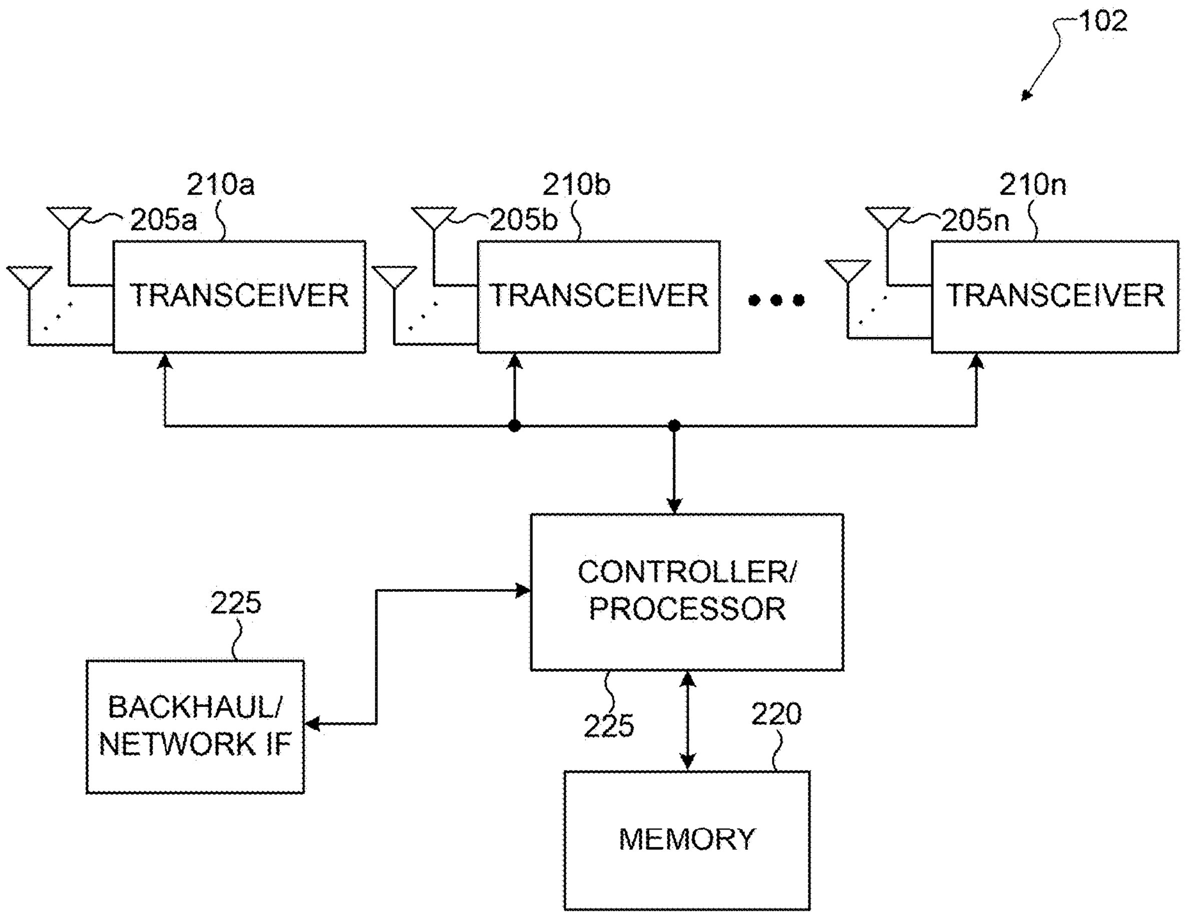
FIG. 2 illustrates an example gNodeB (gNB) according to embodiments of the present disclosure.
Figure 3:
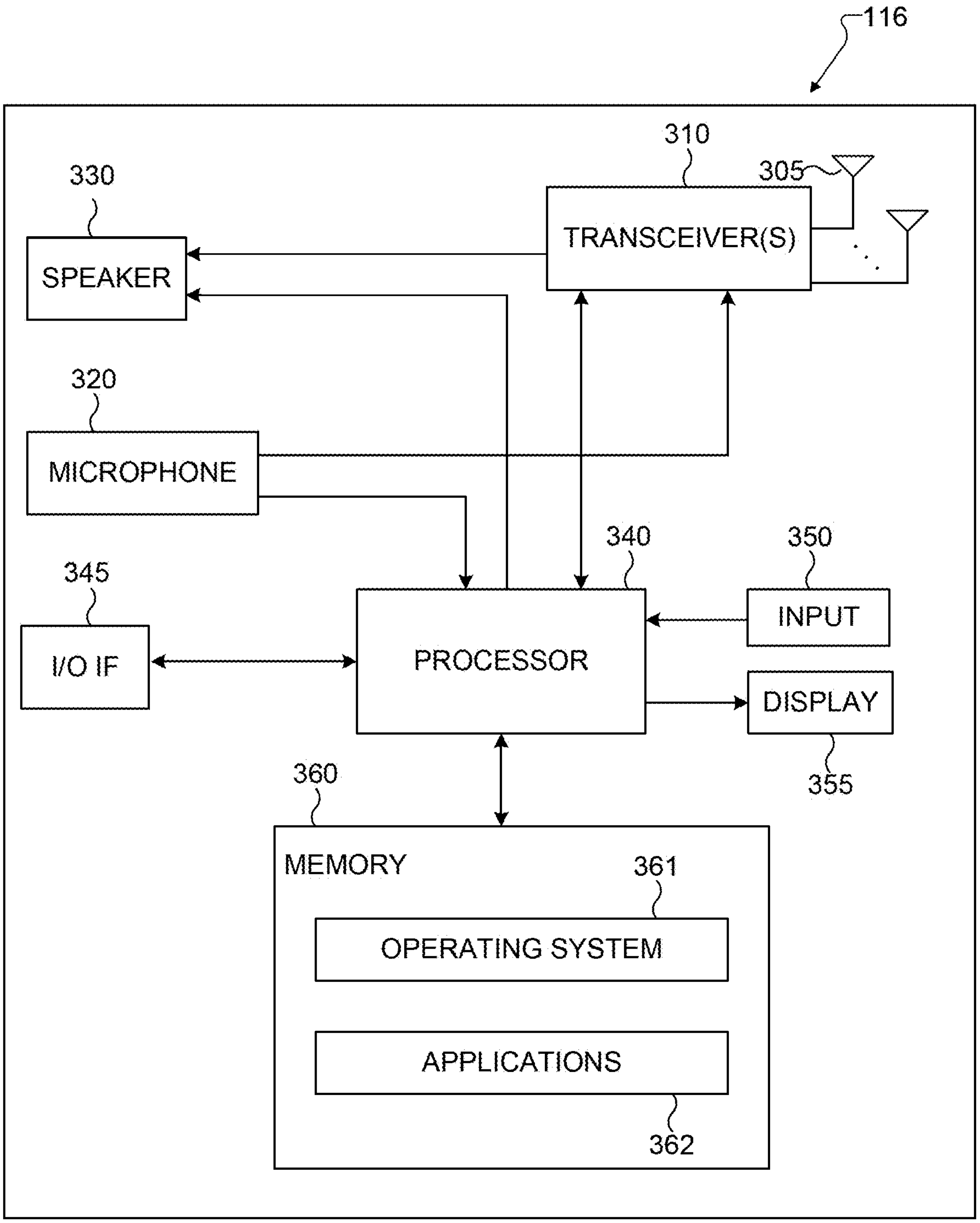
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for performing UE-initiated beam operations. In certain embodiments, one or more of the BSs 101-103 include circuitry, programing, or a combination thereof to support UE-initiated beam operations.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for supporting UE-initiated beam operations. Any of a wide variety of other functions could be supported in the gNB 102 by the controller/processor 225.

The controller/processor 225 is also capable of executing programs and other processes resident in the memory 230, such as processes to support UE-initiated beam operations. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for performing UE-initiated beam operations as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
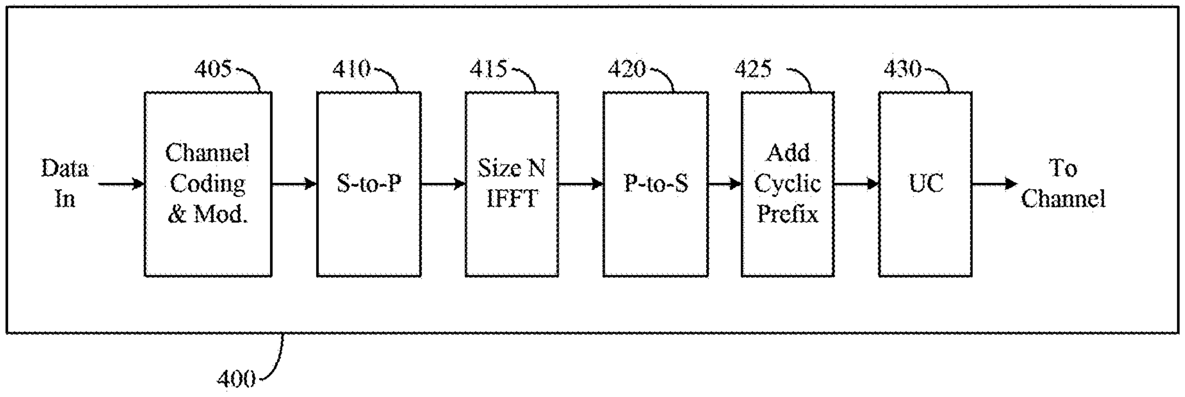
FIGS. 4A and 4B illustrate an example of a wireless transmit and receive paths according to embodiments of the present disclosure.
Figure 4B:
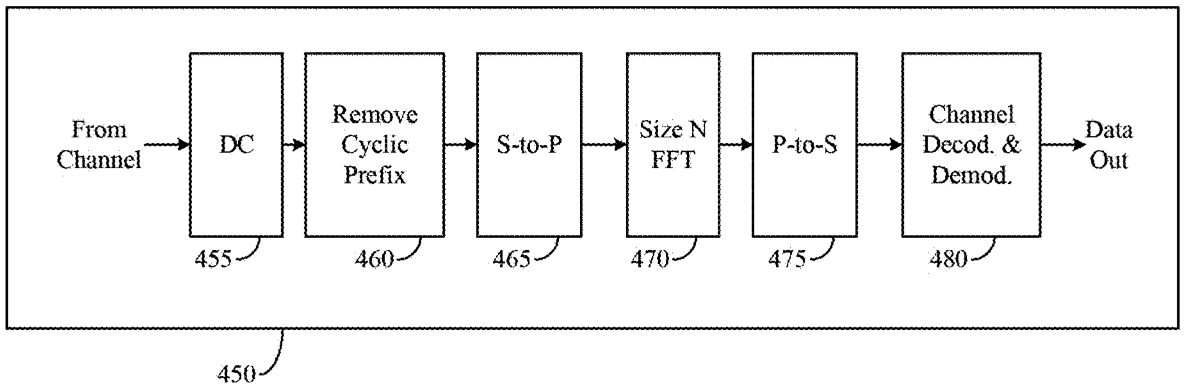

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support UE-initiated beam operations as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or sounding reference signal (SRS). In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5A:
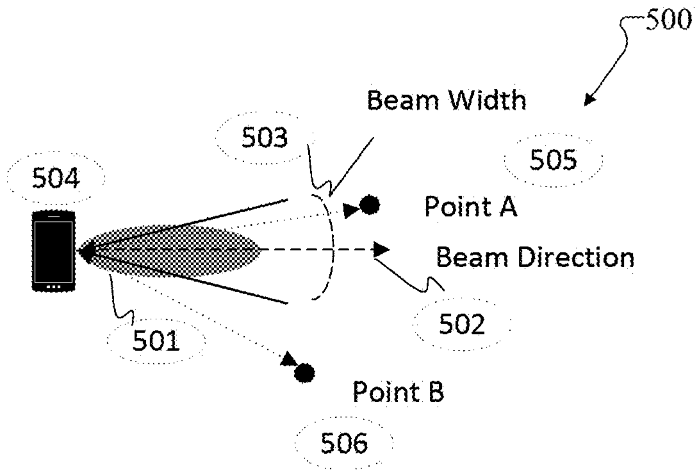
FIG. 5A illustrates an example of a wireless system according to embodiments of the present disclosure.

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
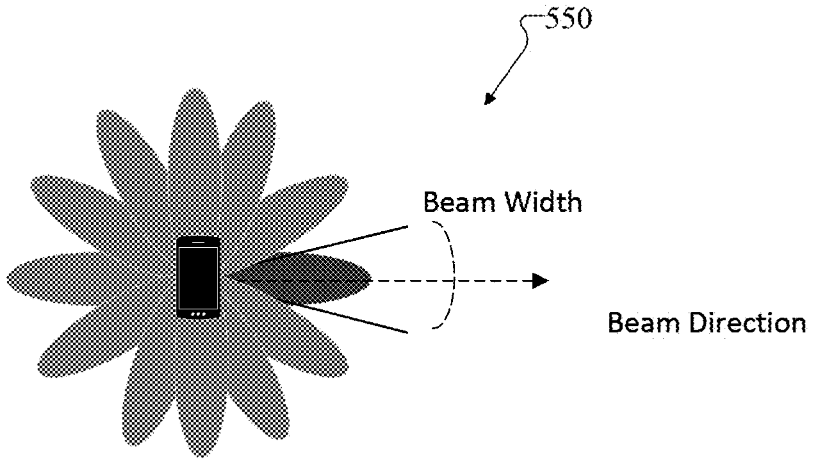
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by gNB 102 of FIG. 2. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
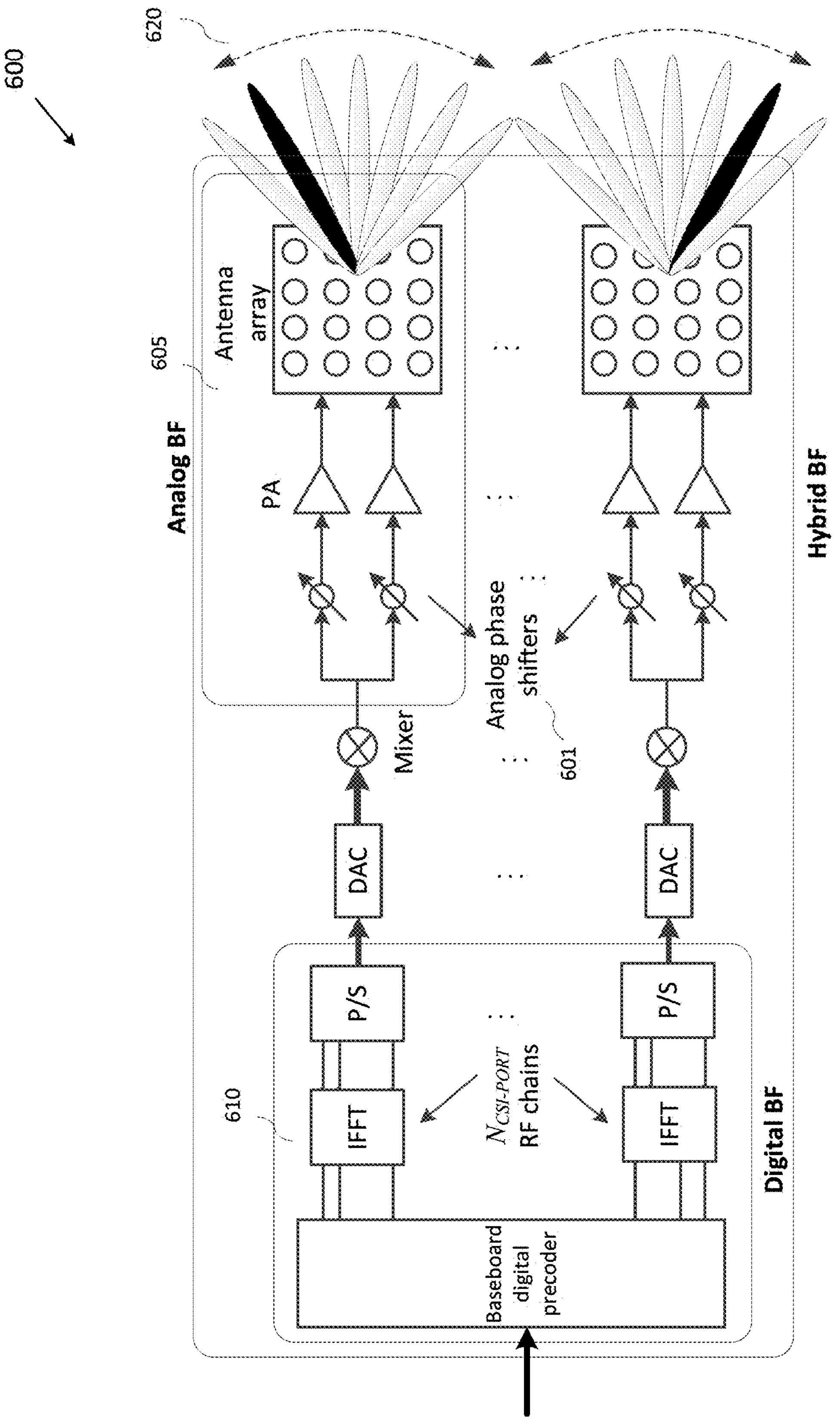
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

The flowcharts herein illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

In (up to Rel.17) NR specification, the most resource-efficient reporting mechanism for a content (e.g., beam, CSI etc., or in general different report quantities) is aperiodic (in conjunction with aperiodic CSI-RS). On the other hand, with a well-chosen periodicity, periodic reporting (followed by semi-persistent) results in the lowest latency at the expense of resources. Although aperiodic reporting seems preferred from the overall operational perspective, in a few relevant scenarios the NW/gNB lacks knowledge on the DL channel condition—or, in other words, the UE knows the DL channel condition better. In this case, it is clearly beneficial if the UE can initiate its own aperiodic reporting for a content (e.g., beam, CSI etc.). For instance, when the UE is configured only with aperiodic beam reporting and the channel condition is worsened to the point of beam failure, the loss of link due to beam failure can be avoided if the UE can transmit an aperiodic beam report without having to wait for a beam report request/trigger from the NW/gNB. Likewise, when the UE is configured only with aperiodic CSI reporting and the channel condition is worsened due to UE speed/movement, the performance degradation due to faster link quality degradation can be avoided if the UE can transmit an aperiodic CSI report without having to wait for a CSI request/trigger from the NW/gNB. Such UE-initiated reporting for a content can be enabled for other types of report quantities (different from traditional beam or CSI reports).

Although UE-initiated reporting can be beneficial, efficient designs are needed to ensure that the latency is reduced and, at the same time, error events can be minimized. Therefore, embodiments of the present disclosure recognize there is a need for efficient designs for UE-initiated reporting for a content that can offer good trade-off between latency and reliability. In particular, when the UE-initiated reporting framework can include multiple report types (or report quantities), or/and multiple event types when a report types can be associated with an event (e.g., for beam report, the event can be beam failure. For CSI, the event can be user throughput degradation or increasing retransmission rate).

This disclosure provides example embodiments on UE-initiated reporting. More specifically, the present disclosure provides various measurement resource/reporting settings/configurations that can enable the UE-initiated or triggered reporting.

The present disclosure provides various novel and detailed resource and reporting settings to enable the UE-initiated/triggered reporting. Furthermore, how a UE would measure (or be configured to measure) the reference signals (RSs) corresponding/associated to the UE-initiated/triggered reporting is specified. Depending on the event type(s), different measurement configurations are specified and the corresponding UE/NW operations are also provided in the present disclosure.

In the present disclosure, a UE detects (or determines) a need for transmitting a UE-initiated/UE-triggered report (or initiation/triggering) of a (report-)type (A), (B), or (C), where:

(A) includes an initiator/trigger/pre-notification message.

(B) includes a report/content (comprising one or multiple report quantities).

(C) includes both a trigger/pre-notification message and a (corresponding) report/content.

The report is to facilitate/enable efficient/timely/fast/reliable communication over the link/channel between a target entity (e.g., NW/gNB or another device) and the UE. The content (if reported) can include a quantity or quantities. At least one of the following examples can be used/configured for the content:

- In one example, the content includes beam-related quantity/quantities. For example, up to N≥1 indicators $\{I_i\}$ or pairs of $\{(I_i,J_i)\}$, where $I_i$ is an beam (source RS) indicator (e.g. CRI, SSBRI) and $J_i$ is a beam metric (e.g. L1-reference signal received power (RSRP), L1-singal-to-interference-plus-noise ratio (SINR)).
- In one example, the content includes CSI-related quantity/quantities. For example, at least one of (rank indicator (RI), precoding matrix indicator (PMI), channel quality indicator (CQI), CQI report interval (CRI), layer index (LI)).
- In one example, the content includes TDCP-related quantity/quantities. For example, an indicator about the Doppler profile (e.g., Doppler spread or Doppler shift, relative Doppler spreads, or relative Doppler shifts) or an indicator about the auto-correlation profiles (e.g. (auto-)correlation values corresponding to a few dominant lags/delays).
- In one example, the content includes other (e.g., non-beam, non-CSI, non-TDCP) quantity/quantities.
  - In one example, quantity/quantities comprise a selector/indicator indicating selection of one (or >1) of either:
    - beam (TCI state) TCI states (e.g., DL TCI state, UL TCI state, or unified (joint) DL/UL TCI state), or
    - panel(s) (e.g., UE panels for DL reception or/and UL transmission), or
    - antenna(e) (e.g., UE antennae for DL reception or/and UL transmission), or
    - antenna port(s) (e.g., UE antenna ports for DL reception or/and UL transmission).
  - In one example, quantity/quantities comprise an indicator indicating switching from one beam to another beam, or from one panel to another, or from one antenna port group to another antenna port group, or from $N_1$ SRS ports to $N_2$ SRS ports, where $N_1 \neq N_2$ (e.g., this switching is for DL reception or/and UL transmission).
- In one example, the content includes beam-related quantity/quantities and at least one other quantity/quantities.
- In one example, the content includes CSI-related quantity/quantities and at least one other quantity/quantities.
- In one example, the content includes TDCP-related quantity/quantities and at least one other quantity/quantities.
- In one example, the content includes beam-related quantity/quantities and CSI-related quantity/quantities.
- In one example, the content includes beam-related quantity/quantities and TDCP-related quantity/quantities.

In one example, the content includes TDCP-related quantity/quantities and CSI-related quantity/quantities.

In one example, the report is targeting a physical layer (L1) communication (e.g., L1 DL/UL, or L1 SL), i.e., such reporting is to enable fast/reliable DL/UL or SL transmission/reception.

In one example, the link/channel between the target entity and the UE 116 is a Uu interface (i.e., DL, UL).

In one example, the link/channel between the target entity and the UE 116 is a sidelink (SL), or a device-to-device (D2D) or PC5 interface.

In one example, such reporting can be non-event-based or autonomous, the UE 116 can initiate/trigger the report autonomously (i.e., without being associated with any event) or unconditionally/freely. For example, the UE 116 can be configured with a triggering time window (or multiple UL slots) and the UE 116 can trigger the report during this window.

In one example, such reporting can be event-based, i.e., the UE 116 can initiate/trigger the report only when it detects an event associated with the report, where the event can be of a (event-)type: type 0, type 1, and so on. In one example, type 0 corresponds to a beam-related event, type 1 corresponds to a CSI-related event, type 2 corresponds to a time-domain channel property (TDCP)-related event, and type 3 can be a non-CSI-related event (according to one or more examples described herein). In one example, if a metric (depending on the event-type) is less than or equal to a threshold (or greater than or equal to a threshold), the event is detected or declared positive. The threshold is chosen such that a failure (e.g., beam/link failure) can be detected before it actually happens and the UE-initiated report can avoid the failure.

In one example, such reporting can be non-event-based or event-based, based on report-type.

In one example, such reporting can be non-event-based or event-based, based on a configuration.

A few examples of the event-types and the report-types are provided in Table 1 (for joint) and Table 2/Table 3 (for separate). In these examples, the event-types and the report-types are separate (explicit). However, they can also be joint, as shown in Table 4. A few examples of the autonomous UE-initiated report are shown in Table 5.

TABLE 1 event-based UE-initiated report

| Event type | Report | | |
|---|---|---|---|
| | Type | Trigger/pre-notification message | Content |
| 0: beam | (A) | Yes (e.g., beam-related event) | No |
| | (B) | No | Yes |
| | (C) | Yes (e.g., beam-related event) | Yes |
| 1: CSI | (A) | Yes (e.g., CSI-related event) | No |
| | (B) | No | Yes |
| | (C) | Yes (e.g., CSI-related event) | Yes |
| 2: TDCP | (A) | Yes (e.g., TDCP-related event) | No |
| | (B) | No | Yes |
| | (C) | Yes (e.g., TDCP-related event) | Yes |
| 3: non-CSI/beam/TDCP | (A) | Yes (e.g., non-CSI-related event) | No |
| | (B) | No | Yes |
| | (C) | Yes (e.g., non-CSI-related event) | Yes |

TABLE 1-continued event-based UE-initiated report

| Event type | Report | | |
|---|---|---|---|
| | Type | Trigger/pre-notification message | Content |
| 4. other (content-free/less events) | (A) | Yes (no need for content) | No |

TABLE 2 event-based UE-initiated report

| Event-type | Event |
|---|---|
| 0 | Beam-related |
| 1 | CSI-related |
| 2 | TDCP-related |
| 3 | Non-beam/CSI/TDCP |
| 4 | Other |

TABLE 3 event-based UE-initiated report

| Report-type | Trigger/pre-notification message | Content |
|---|---|---|
| (A) | Yes | No |
| (B) | No | Yes |
| (C) | Yes | Yes |

TABLE 4 event-based UE-initiated report

| Report | | |
|---|---|---|
| Type | Trigger/pre-notification message | Content |
| 0 | Yes (e.g., beam-related event), content-specific or event-specific | No |
| 1 | No | Beam |
| 2 | Yes (e.g., beam-related event) | Beam |
| 3 | Yes (e.g., CSI-related event) | No |
| 4 | No | CSI |
| 5 | Yes (e.g., CSI-related event) | CSI |
| 6 | Yes (e.g., TDCP-related event) | No |
| 7 | No | TDCP |
| 8 | Yes (e.g., TDCP-related event) | TDCP |
| 9 | Yes (e.g., non-CSI-related event) | No |
| 10 | No | Non-CSI |
| 11 | Yes (e.g., non-CSI-related event) | Non-CSI |

TABLE 5 non-event-based or autonomous UE-initiated report

| Report | | |
|---|---|---|
| Type | Trigger/pre-notification message | Content |
| 0 | Yes (content-agnostic/transparent) | No |
| 1 | No | Beam |
| 2 | Yes | Beam |

TABLE 5-continued

| non-event-based or autonomous UE-initiated report Report | | |
|---|---|---|
| Type | Trigger/pre-notification message | Content |
| 3 | No | CSI |
| 4 | Yes | CSI |
| 5 | No | TDCP |
| 6 | Yes | TDCP |
| 7 | No | Non-CSI |
| 8 | Yes | Non-CSI |

In one example, an index or a parameter (e.g., reportQuantity) can be used to indicate one example from tables herein. The index/parameter can be used to configure the UE-initiated report according to one or more examples described herein, e.g., via higher layer RRC. Such a configuration can be subject to the UE 116 capability. In one example, the index/parameter can also indicate multiple (e.g., 2) examples from table(s) herein. In this case, the UE-initiated report can include the report for at least one for the two.

In a wireless communications system, a UE could be associated to (e.g., transmit various UL channels/signals such as physical uplink control channel (PUCCH), physical uplink shared channel (PUSCH), and/or SRS to or receive various DL channels/signals such as physical downlink control channel (PDCCH), physical downlink shared channel (PDSCH), and/or SSB/CSI-RS from) a set of one or more transmission-reception points (TRPs), wherein a TRP can represent a collection of measurement antenna ports, measurement RS resources, and/or control resource sets (CORESETs). For example, a TRP could be associated with one or more of:

- A plurality of SSBs
- A plurality of CSI-RS resources
- A plurality of CRIs (CSI-RS resource indices/indicators)
- A measurement RS resource set, for example, a CSI-RS resource set along with its indicator
- A plurality of transmission configuration indication (TCI) states
- A plurality of CORESETs associated with a CORESETPoolIndex
- A plurality of CORESETs associated with a TRP-specific index/indicator/identity
- A physical cell identity (PCI)
- A plurality of transmission occasions including PDCCH transmission occasions/repetitions, PDSCH transmission occasions/repetitions, PUCCH transmission occasions/repetitions or PUSCH transmission occasions/repetitions In the present disclosure, the UE could send to the network one or more indicators to indicate/provide one or more of the following:

In one example, the indicator(s) could indicate/provide to the network 130 which one or more of the TRPs (e.g., in the set of TRPs as described herein in the present disclosure) the UE 116 can be associated to. For example, the indicator(s) could correspond to representation(s) of one or more TRPs as specified herein in the present disclosure. For another example, the UE 116 could be initially associated to a set of N>1 (e.g., N=2) TRPs. The UE 116 could then indicate to the network 130—via the indicator(s)—(which) one or more of the N>1 TRPs—e.g., in form of their representation(s) as specified herein in the present disclosure—the UE 116 could be associated to. For N=2, the UE 116 could send to the network 130 a one-bit indicator (either 0 or 1) indicating that the UE 116 can be associated to one of the N=2 TRPs (e.g., either the first or the second TRP). Yet for another example, the UE 116 could be initially associated to a single TRP (i.e., N=1). The UE 116 could then indicate to the network 130—via the indicator(s)—that the UE 116 can be associated to more than one TRPs and also their (i.e., TRPs') representation(s) as specified herein in the present disclosure. The indicator(s) described herein in the present disclosure could be common for one or more channels/signals such as DL (control/data) channels/signals including PDCCH and PDSCH and/or UL (control/data) channels/signals including PUCCH and PUSCH—e.g., the indicator(s) could be common for all channels/signals including DL (control/data) channels/signals such as PDCCH and PDSCH and UL (control/data) channels/signals such as PUCCH and PUSCH; alternatively, the indicator(s) could be different for different channels/signals—i.e., the indicator(s) is per channel or per signal. The described design examples/procedures herein can also be referred to as UE-initiated/triggered (dynamic) TRP(s) switching/selection.

In another example, the indicator(s) could indicate/provide to the network 130 to switch on/off or activate/deactivate one or more of the CORESET pool index configurations or switch between single-downlink control information (DCI) (SDCI) and multi-DCI (MDCI) based multi-TRP (MTRP) operations. For example, the UE 116 could be first provided by the network 130 in PDCCH-Config two values (i.e., 0 and 1) of CORESET pool index—provided by CORESETPoolIndex, wherein each CORESET pool index value is associated/linked to one or more channels/signals including PDCCH (e.g., by providing CORESETPoolIndex in the corresponding ControlResourceSet), PDSCH (e.g., scheduled by PDCCH(s) received in CORESET(s) associated/configured with the CORESETPoolIndex), PUCCH (e.g., by providing CORESETPoolIndex in the corresponding higher layer parameter such as PUCCH-Config), PUSCH (e.g., scheduled by PDCCH(s) received in CORESET(s) associated/configured with the CORESETPoolIndex), CSI-RS (e.g., triggered/activated by PDCCH(s) received in CORESET(s) associated/configured with the CORESETPoolIndex), and/or SRS (e.g., triggered/activated by PDCCH(s) received in CORESET(s) associated/configured with the CORESETPoolIndex). The UE 116 could then indicate/provide to the network 130—via the indicator(s)—to switch/turn off or deactivate one or two of the configured CORESET pool index values, and therefore, the associated/linked channels/signals. For another example, the UE 116 could be provided by the network 130 in PDCCH-Config a single value of CORESET pool index (e.g., 0) or may not be provided by the network 130 any CORESETPoolIndex value(s). For this case, the UE 116 could indicate/provide to the network 130—via the indicator(s)—to activate/configure two values (i.e., 0 and 1) of CORESET pool index, and therefore, associate/link one or more channels/signals to each of the CORESETPoolIndex values. The indicator(s) described herein in the present disclosure could be common for one or more channels/signals such as DL (control/data) channels/signals including PDCCH and PDSCH and/or UL (control/data) channels/signals including PUCCH and PUSCH—e.g., the indicator(s) could be common for all channels/signals including DL (control/data) channels/signals such as PDCCH and PDSCH and UL (control/data) channels/signals such as PUCCH and PUSCH; alternatively, the indicator(s) could be different for different channels/signals—i.e., the indicator(s) is per channel or per signal. The described design examples/procedures herein can also be referred to as UE-initiated/triggered (dynamic) SDCI MTRP and MDCI MTRP switching/selection.

In yet another example, the indicator(s) could indicate/provide to the network 130 to switch on/off or activate/deactivate repetition transmissions for one or more channels/signals. For example, the UE 116 could indicate/provide to the network 130—via the indicator(s)—to turn/switch on/off or activate/deactivate one or more PDCCH repetition scheme(s) wherein one or more PDCCH candidates can be received/monitored in one or more search space sets (or one or more CORESETs) configured with a same higher layer parameter searchSpaceLinking. For another example, the UE 116 could indicate/provide to the network 130—via the indicator(s)—to turn/switch on/off or activate/deactivate one or more PDSCH repetition schemes. In one example, the indicator(s) could indicate/provide to the network 130 that the PDSCH repetition scheme corresponding to that when the higher layer parameter repetitionScheme is set to 'fdmSchemeA' can be turned/switched on/off or activated/deactivated. In another example, the indicator(s) could indicate/provide to the network 130 that the PDSCH repetition scheme corresponding to that when the higher layer parameter repetitionScheme is set to 'fdmSchemeB' can be turned/switched on/off or activated/deactivated. In yet another example, the indicator(s) could indicate/provide to the network 130 that the PDSCH repetition scheme corresponding to that when the higher layer parameter repetitionScheme is set to 'tdmSchemeA' can be turned/switched on/off or activated/deactivated. In yet another example, the indicator(s) could indicate/provide to the network 130 that the PDSCH repetition scheme corresponding to that when the higher layer parameter repetitionNumber in PDSCH-TimeDomainResourceAllocation is provided/enabled can be turned/switched on/off or activated/deactivated. Yet for another example, the UE 116 could indicate/provide to the network 130—via the indicator(s)—to turn/switch on/off or activate/deactivate one or more PUCCH repetition scheme(s) wherein the UE 116 could be configured with a number of slots, denoted by Npucch, for repetitions of a PUCCH transmission. Yet for another example, the UE 116 could indicate/provide to the network 130—via the indicator(s)—to turn/switch on/off or activate/deactivate one or more PUSCH repetition scheme(s) wherein two SRS resource sets are configured in srs-ResourceSetToAddModList or srs-ResourceSetToAddModListDCI-0-2 with higher layer parameter usage in SRS-ResourceSet set to 'codebook' or 'noncodebook'. In one example, the indicator(s) could indicate/provide to the network 130 that the PUSCH repetition Type A can be turned/switched on/off or activated/deactivated. In another example, the indicator(s) could indicate/provide to the network 130 that the PUSCH repetition Type B can be turned/switched on/off or activated/deactivated. The indicator(s) as described herein in the present disclosure could be common for one or more channels/signals such as DL (control/data) channels/signals including PDCCH and PDSCH and/or UL (control/data) channels/signals including PUCCH and PUSCH—e.g., the indicator(s) could be common for all channels/signals including DL (control/data) channels/signals such as PDCCH and PDSCH and UL (control/data) channels/signals such as PUCCH and PUSCH; alternatively, the indicator(s) could be different for different channels/signals—i.e., the indicator(s) is per channel or per signal. The described design examples/procedures herein can also be referred to as UE-initiated/triggered (dynamic) channel repetition and non-repetition switching/selection.

The indicator(s) described herein in the present disclosure could correspond to the trigger/pre-notification message in a (report-)type (A) based report or a (report-)type (C) based report, or part of the (corresponding) content in a (report-)type (B) based report or a (report-)type (C) based report. Furthermore, the signaling medium/container for reporting the indicator(s) as specified herein in the present disclosure (or equivalently, the trigger/pre-notification message in a (report-)type (A) based report or a (report-)type (C) based report, or part of the (corresponding) content in a (report-)type (B) based report or a (report-)type (C) based report) could be PUCCH, PUSCH, physical random access channel (PRACH), medium access control (MAC) control element (CE), uplink control information (UCI), etc. The UE 116 may expect to receive from the network 130 an acknowledgement (ACK) (or negative ACK (NACK)) for the indicator(s) specified herein in the present disclosure within a first time window/offset (e.g., in terms of the number of slots/symbols/etc.) starting from the transmission of the indicator(s) (e.g., starting from the corresponding slot/symbol/etc.). The value of the first time window/offset could be: (i) fixed in the system specification(s), (ii) configured/provided/indicated by the network 130, e.g., via higher layer RRC signaling/parameter and/or MAC CE command and/or dynamic DCI based L1 signaling, or (iii) autonomously determined by the UE 116 and sent to the network 130 via uplink channels such as PUCCH/PUSCH.

When/if the UE 116 does not receive from the network 130 an ACK for the indicator(s) within the first time window/offset starting from the transmission of the indicator(s) or receives a NACK for the indicator(s) within the first time window/offset starting from the transmission of the indicator(s), the UE 116 could (re-)send the indicator(s).

When/if the UE 116 receives from the network 130 an ACK for the indicator(s) within the first time window/offset starting from the transmission of the indicator(s), the UE 116 may perform the behaviors/operations and/or assume the corresponding network's operations according to the indicator(s) X duration/offset/time (e.g., X symbols/slots/etc.) starting from the reception of the ACK message for the indicator(s). The value of X could be: (i) fixed in the system specification(s), (ii) configured/provided/indicated by the network 130, e.g., via higher layer RRC signaling/parameter and/or MAC CE command and/or dynamic DCI based L1 signaling, or (iii) autonomously determined by the UE 116 and sent to the network 130 via uplink channels such as PUCCH/PUSCH.

In a wireless communications system, a UE could be indicated/configured/provided by the network 130, e.g., via higher layer RRC signaling/parameter(s) and/or MAC CE (activation) command(s) and/or dynamic DCI based L1 signaling, one or more transmission configuration indication (TCI) states for receiving DL channels/signals such as PDCCH, PDSCH, and/or CSI-RS—e.g., by setting the corresponding spatial-domain receive filter(s) according to the QCL source RS(s) indicated/provided in the TCI state(s) and/or for transmitting UL channels/signals such as PUCCH, PUSCH, and/or SRS—e.g., by setting the corresponding spatial-domain transmit filter(s) according to the QCL source RS(s) indicated/provided in the TCI state(s), wherein a QCL source RS could correspond to a SSB or a non-zero power (NZP) CSI-RS and a TCI state could be provided by TCI-State or DLorJoint-TCIState (e.g., for a joint DL and UL TCI state or a separate DL TCI state) or by TCI-State or ULTCI-State (e.g., for a separate UL TCI state). Alternatively, a UE could be indicated/configured/provided by the network 130, e.g., via higher layer RRC signaling/parameter(s) and/or MAC CE (activation) command(s) and/or dynamic DCI based L1 signaling, one or more TCI states for receiving DL channels/signals such as PDCCH, PDSCH and/or CSI-RS—e.g., by setting the corresponding spatial-domain receive filter(s) according to the QCL source RS(s) indicated/provided in the TCI state(s) and/or one or more RSs in spatial relationship information (e.g., provided by PUCCH-SpatialRelationInfo) for transmitting UL channels/signals such as PUCCH—e.g., by setting the corresponding spatial domain transmit filter(s) according to the RS(s) indicated/provided in the spatial relationship information and/or one or more SRS resource indicators (SRIs) for transmitting UL channels/signals such as PUSCH and/or SRS—e.g., by setting the corresponding spatial-domain transmit filter(s) according to the SRI(s), wherein a (QCL source) RS could correspond to a SSB or a NZP CSI-RS and a TCI state could be provided by TCI-State or DLorJoint-TCIState (e.g., for a joint DL and UL TCI state or a separate DL TCI state) or by TCI-State or ULTCI-State (e.g., for a separate UL TCI state).

In the present disclosure, the UE could send to the network one or more indicators (e.g., to inform of a (UE-initiated/triggered) report in its entirety as specified herein in the present disclosure or in part of a (UE-initiated/triggered) report as specified herein in the present disclosure) to indicate/provide to the network 130 information/indication related to one or more of the indicated TCI states (e.g., in terms of their TCI state IDs or indexes in the set of indicated TCI states) or one or more of the indicated SRIs (e.g., in terms of their SRI values) or one or more of the RSs indicated in the TCI state(s) or spatial relationship information (e.g., in terms of their RS IDs or indexes in the set of indicated RSs). The indicator(s) described herein in the present disclosure could correspond to the trigger/pre-notification message in a (report-)type (A) based report or a (report-)type (C) based report, or part of the (corresponding) content in a (report-)type (B) based report or a (report-)type (C) based report. Furthermore, the signaling medium/container for reporting the indicator(s) as specified herein in the present disclosure (or equivalently, the trigger/pre-notification message in a (report-)type (A) based report or a (report-)type (C) based report, or part of the (corresponding) content in a (report-)type (B) based report or a (report-)type (C) based report) could be PUCCH, PUSCH, PRACH, MAC CE, UCI, etc. The UE 116 may expect to receive from the network 130 an ACK (or NACK) for the indicator(s) specified herein in the present disclosure within a first time window/offset (e.g., in terms of the number of slots/symbols/etc.) starting from the transmission of the indicator(s) (e.g., starting from the corresponding slot/symbol/etc.). The value of the first time window/offset could be: (i) fixed in the system specification(s), (ii) configured/provided/indicated by the network 130, e.g., via higher layer RRC signaling/parameter and/or MAC CE command and/or dynamic DCI based L1 signaling, or (iii) autonomously determined by the UE 116 and sent to the network 130 via uplink channels such as PUCCH/PUSCH.

- When/if the UE 116 does not receive from the network 130 an ACK for the indicator(s) within the first time window/offset starting from the transmission of the indicator(s) or receives a NACK for the indicator(s) within the first time window/offset starting from the transmission of the indicator(s), the UE 116 could (re-)send the indicator(s).
- When/if the UE 116 receives from the network 130 an ACK for the indicator(s) within the first time window/offset starting from the transmission of the indicator(s):
  - In one example, the UE 116 may expect to receive from the network 130, e.g., via higher layer RRC signaling/parameter and/or MAC CE (activation) command(s) and/or dynamic DCI based L1 signaling, a validation for the indicator(s) sent by the UE 116 within a second time window/offset (e.g., in terms of the number of slots/symbols/etc.) starting from the reception of the ACK (e.g., starting from the corresponding slot/symbol/etc.). The value of the second time window/offset could be: (i) fixed in the system specification(s), (ii) configured/provided/indicated by the network 130, e.g., via higher layer RRC signaling/parameter and/or MAC CE command and/or dynamic DCI based L1 signaling, or (iii) autonomously determined by the UE 116 and sent to the network 130 via uplink channels such as PUCCH/PUSCH. X duration/offset/time (e.g., X symbols/slots/etc.) after the reception of the validation, the UE 116 may use/apply the TCI state(s) or the SRI(s) or the RS(s) indicated in the TCI state(s) or spatial relationship information—indicated/provided by the indicator(s) as specified herein in the present disclosure—to receive DL channels/signals including PDCCH, PDSCH, and/or CSI-RS, and/or transmit UL channels/signals including PUCCH, PUSCH, and/or SRS.
  - In another example, the UE 116 may expect to receive from the network 130, e.g., via higher layer RRC signaling/parameter and/or MAC CE (activation) command(s) and/or dynamic DCI based L1 signaling, further information/indication related to one or more of the indicated TCI states (e.g., in terms of their TCI state IDs or indexes in the set of indicated TCI states) or one or more of the indicated SRIs (e.g., in terms of their SRI values) or one or more of the RSs indicated in the TCI state(s) or spatial relationship information (e.g., in terms of their RS IDs or indexes in the set of indicated RSs) within a second time window/offset (e.g., in terms of the number of slots/symbols/etc.) starting from the reception of the ACK (e.g., starting from the corresponding slot/symbol/etc.). The value of the second time window/offset could be: (i) fixed in the system specification(s), (ii) configured/provided/indicated by the network 130, e.g., via higher layer RRC signaling/parameter and/or MAC CE command and/or dynamic DCI based L1 signaling, or (iii) autonomously determined by the UE 116 and sent to the network 130 via uplink channels such as PUCCH/PUSCH. X duration/offset/time (e.g., X symbols/ slots/etc.) after receiving the further information/indication from the network 130 as described herein in the present disclosure, the UE 116 may use/apply the TCI state(s) or the SRI(s) or the RS(s) indicated in the TCI state(s) or spatial relationship information—indicated/provided by the further information/indication sent from the network 130 as specified herein in the present disclosure—to receive DL channels/signals including PDCCH, PDSCH, and/or CSI-RS, and/or transmit UL channels/signals including PUCCH, PUSCH, and/or SRS.

In yet another example, the UE 116 may use/apply the TCI state(s) or the SRI(s) or the RS(s) indicated in the TCI state(s) or spatial relationship information—indicated/provided by the indicator(s) sent from the UE 116 as specified herein in the present disclosure—to receive DL channels/signals including PDCCH, PDSCH, and/or CSI-RS, and/or transmit UL channels/signals including PUCCH, PUSCH, and/or SRS, starting from X duration/offset/time (e.g., X symbols/slots/etc.) after the reception of the ACK message for the indicator(s).

In yet another example, the UE 116 may assume that the TCI state(s) or the SRI(s) or the RS(s) indicated in the TCI state(s) or spatial relationship information—indicated/provided by the indicator(s) sent from the UE 116 as specified herein in the present disclosure—could be activated/deactivated or configured/not configured or indicated/not indicated by the network 130, starting from X duration/offset/time (e.g., X symbols/slots/etc.) after the reception of the ACK message for the indicator(s).

The value of X could be: (i) fixed in the system specification(s), (ii) configured/provided/indicated by the network 130, e.g., via higher layer RRC signaling/parameter and/or MAC CE command and/or dynamic DCI based L1 signaling, or (iii) autonomously determined by the UE 116 and sent to the network 130 via uplink channels such as PUCCH/PUSCH.

The indicator(s) described herein in the present disclosure could be common for one or more channels/signals such as DL (control/data) channels/signals including PDCCH and PDSCH and/or UL (control/data) channels/signals including PUCCH and PUSCH—e.g., the indicator(s) could be common for all channels/signals including DL (control/data) channels/signals such as PDCCH and PDSCH and UL (control/data) channels/signals such as PUCCH and PUSCH; alternatively, the indicator(s) could be different for different channels/signals—i.e., the indicator(s) is per channel or per signal. In addition, the indicator(s) described herein in the present disclosure could be common for one or more TRPs (e.g., in form of their representations as specified herein in the present disclosure such as CORESET pool index values); alternatively, the indicator(s) could be different for different TRPs (and therefore, their representations such as CORESET pool index values).

In one embodiment, under the Rel-15/16 TCI framework, the UE 116 could receive from the network 130 one or more MAC CEs for TCI state indication for PDCCH reception/monitoring, wherein each MAC CE (e.g., TCI State Indication for UE-specific PDCCH MAC CE) could indicate/provide a TCI state/TCI state ID and a CORESET ID. Upon receiving such a MAC CE, the UE 116 could use/apply the TCI state indicated therein to receive/monitor PDCCH(s) received in a CORESET, wherein CORESET ID of the CORESET is indicated in the MAC CE. Furthermore, different PDCCHs or PDCCH candidates could be received/monitored in one or more search space sets (or one or more CORESETs) configured with a same higher layer parameter searchSpaceLinking.

In one example, the UE 116 could indicate/provide to the network 130, via one or more indicators—e.g., in form of the UE-initiated/triggered report as specified herein in the present disclosure in its entirety or in part of the UE-initiated/triggered report as specified herein in the present disclosure, to turn/switch on/off or activate/deactivate one or more MAC CEs for TCI state indication for PDCCH reception/monitoring as specified herein in the present disclosure. The indicator(s) could correspond to one or more of the following.

For example, the indicator(s) could correspond to one or more TCI state IDs, wherein the TCI state ID(s) could correspond to one or more of the TCI state IDs indicated/provided in the MAC CE(s) for TCI state indication for PDCCH reception. For instance, the indicator (s) could indicate the lowest (or highest) TCI state ID, or a specific TCI state ID that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH, or other signaling mediums.

For another example, the indicator(s) could be a one-bit (0 or 1) indicator with 0 indicating the lowest (or highest) TCI state ID or a first specific TCI state ID that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH, or other signaling mediums and 1 indicating the highest (or lowest) TCI state ID or a second specific TCI state ID that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH or other signaling mediums. The indicator(s) could also be a multi-bit (i.e., more than 1) indicator—e.g., a two-bit indicator with '00', '01', 10' and '11' as the corresponding states—with each state indicating one or more TCI state IDs similar to those specified for the one-bit indicator discussed herein in the present disclosure.

Yet for another example, the indicator(s) could correspond to one or more CORESET IDS, wherein the CORESET ID(s) could correspond to one or more of the CORESET IDs indicated/provided in the MAC CE(s) for TCI state indication for PDCCH reception. For instance, the indicator(s) could indicate the lowest (or highest) CORESET ID or a specific CORESET ID that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH, or other signaling mediums.

Yet for another example, the indicator(s) could be a one-bit (0 or 1) indicator with 0 indicating the lowest (or highest) CORESET ID or a first CORESET ID that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH, or other signaling mediums and 1 indicating the highest (or lowest) CORESET ID, or a second CORESET ID that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH, or other signaling mediums. The indicator(s) could also be a multi-bit (i.e., more than 1) indicator—e.g., a two-bit indicator with '00', '01', 10', and '11' as the corresponding states—with each state indicating one or more CORESET IDs similar to those specified for the one-bit indicator discussed herein in the present disclosure.

Yet for another example, the indicator(s) could correspond to one or more CORESET pool indexes, wherein the CORESET pool index(es) could be associated to one or more of the CORESETs/CORESET IDs indicated/provided in the MAC CE(s) for TCI state indication for PDCCH reception—e.g., a CORESETPoolIndex could be provided/configured/indicated in. For instance, the indicator(s) could indicate the lowest (or highest) CORESET pool index value, or a specific CORESET pool index value that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH or other signaling mediums.

Yet for another example, the indicator(s) could be a one-bit (0 or 1) indicator with 0 indicating the lowest (or highest) CORESET pool index value or a first CORESET pool index value that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH, or other signaling mediums and 1 indicating the highest (or lowest) CORESET pool index value, or a second CORESET pool index value that could be (i) fixed in the system specification(s), (ii) configured/provided by the network 130, e.g., via higher layer RRC signaling/parameter and/or MAC CE command and/or dynamic DCI based L1 signaling, or (iii) autonomously determined by the UE 116 and reported to the network 130 via PUCCH, PUSCH, or other signaling mediums. The indicator(s) could also be a multi-bit (i.e., more than 1) indicator—e.g., a two-bit indicator with '00', '01', 10', and '11' as the corresponding states—with each state indicating one or more CORESET pool indexes similar to those specified for the one-bit indicator discussed herein in the present disclosure. In this example, the CORESET pool index(es) indicated by the indicator(s) could be associated to one or more of the CORESETs/CORESET IDs indicated/provided in the MAC CE(s) for TCI state indication for PDCCH reception.

Yet for another example, the indicator(s) could correspond to information related to one or more (indicated) MAC CEs for TCI state indication for UE-specific PDCCH including the corresponding MAC CE IDs, transmission/reception time, or ordering of the MAC CEs—e.g., among each of the indicated MAC CEs for TCI state indication for PDCCH, indexes of the MAC CEs—e.g., among each of the indicated MAC CEs for TCI state indication for PDCCH reception, etc.

Yet for another example, the indicator(s) could indicate/provide to the network 130 to send more than one MAC CEs for TCI state indication for PDCCH reception, wherein one or more search space sets in one or more of the CORESETs (CORESET IDs) provided/indicated in the MAC CEs could be linked via higher layer parameter SearchSpaceLinking. Alternatively, the indicator(s) could indicate/provide to the network 130 to send one or more MAC CEs for TCI state indication for PDCCH reception, wherein one or more search space sets in the CORESET(s) provided/indicated in the one or more MAC CEs are not linked—e.g., via higher layer parameter SearchSpaceLinking.

Yet for another example, the indicator(s) could indicate/provide to the network 130 the number of TCI states (e.g., one or two) that can be indicated/provided for PDCCH reception/monitoring.

The indicator(s) described herein in the present disclosure could correspond to the trigger/pre-notification message in a (report-)type (A) based report or a (report-)type (C) based report, or part of the (corresponding) content in a (report-)type (B) based report or a (report-)type (C) based report. That is, the indicator(s) specified herein in the present disclosure could be in form of the UE-initiated/triggered report in its entirety or in part of the UE-initiated/triggered report. Optionally, the indicator(s) described herein in the present disclosure could be in form of a (NW-initiated/triggered) beam/CSI report or in part of a (NW-initiated/triggered) beam/CSI report. Furthermore, the signaling medium/container for reporting the indicator(s) as specified herein in the present disclosure (or equivalently, the trigger/pre-notification message in a (report-)type (A) based report or a (report-)type (C) based report, part of the (corresponding) content in a (report-) type (B) based report or a (report-)type (C) based report, the UE-initiated/triggered report, part of the UE-initiated/triggered report, the (NW-initiated/triggered) beam/CSI report, or part of the (NW-initiated/triggered) beam/CSI report) could be PUCCH, PUSCH, PRACH, MAC CE, UCI, etc.

The aforementioned (NW-initiated/triggered) beam/CSI report could correspond to a group-based (beam) report or a non-group-based (beam) report.

As an example of the group-based report, the UE 116 could report, in a single/same CSI report or reporting instance, up to $G \geq 1$ (e.g., $G=4$) groups/pairs of resource indicators such as synchronization signal/physical broadcast channel block Resource Indicators (SSBRIs) and/or CRIs (and their corresponding beam metrics such as L1-RSRPs and/or L1-SINRs), wherein each group/pair could contain up to $P \geq 1$ (e.g., $P=2$) resource indicators such as SSBRIs and/or CRIs (and their corresponding beam metrics such as L1-RSRPs and/or L1-SINRs). Furthermore, the resource indicators reported in the same group/pair could be respectively determined/selected from one or more resource sets (e.g., one or more SSB resource sets and/or one or more NZP CSI-RS resource sets) that are configured in a single/same CSI resource setting. For instance, the UE 116 could report, in a single/same CSI report or reporting instance, four groups/pairs of resource indicators such as SSBRIs and/or CRIs (and their corresponding beam metrics such as L1-RSRPs and/or L1-SINRs), wherein each group/pair could contain two resource indicators such as SSBRIs and/or CRIs (and their corresponding beam metrics such as L1-RSRPs and/or L1-SINRs). For this case, the two resource indicators reported in the same group/pair could be respectively determined/selected from one or two resource sets (e.g., one or two SSB resource sets and/or one or two NZP CSI-RS resource sets) that are configured in a single/same CSI resource setting. The UE 116 could assume simultaneous reception of the SSBs and/or CSI-RSs (with a same or different spatial domain receive filter(s)) corresponding to the resource indicators reported in the same group/pair.

As an example of the non-group-based report, the UE 116 could report, in a single/same CSI report or reporting instance, up to $Q \geq 1$ (e.g., $Q=4$) resource indicators such as SSBRIs and/or CRIs (and their corresponding beam metrics such as L1-RSRPs and/or L1-SINRs), wherein the reported Q resource indicators could be determined/selected from a single/same resource set (e.g., a SSB resource set or a NZP CSI-RS resource set) that is configured in a single/same CSI resource setting.

In one example, the UE 116 could provide, e.g., in part of a beam/CSI report, one or more indicators to indicate whether the report is a group-based report or a non-group-based report as specified herein in the present disclosure. For instance, the indicator(s) could correspond to a one-bit indicator with 0 indicating that the beam/CSI report is a group-based (or non-group-based) report and 1 indicating that the report is a non-group-based (or group-based) report.

In one example, whether or not a beam/CSI report—sent by the UE 116—is a group-based or a non-group-based report could also provide/indicate—to the network 130—the same NW and/or UE behaviors/operations as the one or more indicators as specified herein in the present disclosure. That is, whether or not a beam/CSI report—sent by the UE 116—is a group-based or a non-group-based report could provide/indicate to the network 130 to turn/switch on/off or activate/deactivate one or more MAC CEs for TCI state indication for PDCCH reception/monitoring as specified herein in the present disclosure.

For example, when/if a UE sends to the network 130 a group-based (beam) report as specified herein in the present disclosure, the group-based report—sent by the UE 116—could also indicate/provide to the network 130 to send more than one MAC CEs for TCI state indication for PDCCH reception, wherein one or more search space sets in one or more of the CORESETs (CORESET IDs) provided/indicated in the MAC CEs could be linked via higher layer parameter SearchSpaceLinking. When/if a UE sends to the network 130 a non-group-based (beam) report as specified herein in the present disclosure, the non-group-based report—sent by the UE 116—could also indicate/provide to the network 130 to send one or more MAC CEs for TCI state indication for PDCCH reception, wherein one or more search space sets in the CORESET(s) provided/indicated in the one or more MAC CEs are not linked—e.g., via higher layer parameter SearchSpaceLinking.

For another example, whether or not a beam/CSI report—sent by the UE 116—is a group-based (or non-group-based) report could correspond to the one-bit indicator as specified herein in the present disclosure. Sending a group-based (beam) report could correspond to setting the one-bit indicator as specified herein in the present disclosure as 0 (or 1) and sending a non-group-based (beam) report could correspond to setting the one-bit indicator as specified herein in the present disclosure as 1 (or 0).

In one embodiment, as specified herein in the present disclosure, under the unified TCI framework, a UE could be indicated/provided by the network 130, e.g., in a beam indication MAC CE or via one or more TCI codepoints by one or more TCI fields in a beam indication DCI (e.g., DCI format 1_1 or 1_2 with or without DL assignment), a set of one or more TCI states for each UE-dedicated downlink and/or uplink data and control channels and signals, wherein a TCI state here could correspond to a joint TCI state, a separate DL TCI state or a separate UL TCI state.

In one example, the UE 116 could send to the network 130 one or more indicators—e.g., in form of a (UE-initiated/triggered) beam/CSI report in its entirety or in part of a (UE-initiated/triggered) beam/CSI report as specified herein in the present disclosure—to indicate/provide to the network 130 to turn/switch on/off one or more of the indicated TCI states in the set for UE-dedicated transmission(s) and/or reception(s)—in this embodiment for PDCCH reception/monitoring. The indicator(s) discussed here (i.e., in this embodiment) could correspond to the indicator(s) specified herein in the present disclosure (e.g., according to one or more examples described herein) and also provide/indicate—to the network 130—same or similar NW and/or UE operations or behaviors as the indicator(s) specified herein in the present disclosure (e.g., according to one or more examples described herein).

For example, the indicator(s) discussed herein could correspond to one or more TCI state IDs or indexes of one or more TCI states in the set of indicated TCI states.

For another example, the indicator(s) discussed herein could indicate/provide to the network 130 that the first indicated TCI state/pair of TCI states in the set could be used/applied for PDCCH reception; e.g., the indicator (s) could correspond to TCI state ID(s) of the first TCI state(s) in the set or index(es) of the first TCI state(s) in the set; or the indicator(s) could be a one-bit indicator set to ‘0’ or ‘1’ indicating the above.

For another example, the indicator(s) discussed herein could indicate/provide to the network 130 that the second indicated TCI state/pair of TCI states in the set could be used/applied for PDCCH reception; e.g., the indicator(s) could correspond to TCI state ID(s) of the second TCI state(s) in the set or index(es) of the second TCI state(s) in the set; or the indicator(s) could be a one-bit indicator set to ‘0’ or ‘1’ indicating the above.

For another example, the indicator(s) discussed herein could indicate/provide to the network 130 that the both of the first and second indicated TCI states/pairs of TCI states in the set could be used/applied for PDCCH reception; e.g., the indicator(s) could correspond to TCI state IDs of the first and second TCI states in the set or indexes of the first and second TCI states in the set; or the indicator(s) could be a one-bit indicator set to ‘0’ or ‘1’ indicating the above.

For another example, the indicator(s) discussed herein could correspond to a two-bit indicator e.g., when a set of two joint/DL/UL TCI states or pairs of TCI states are indicated via MAC CE or DCI as specified herein in the disclosure. When/if the 2-bit indicator(s) discussed herein is set to ‘00’ (‘01’, ‘10’ or ‘11’), the UE 116 could or may indicate/provide to the network 130 that the first indicated TCI state/pair of TCI states in the set could be used/applied for PDCCH reception, when/if the 2-bit indicator(s) discussed herein is set to '01' ('00', '10' or '11'), the UE 116 could or may indicate/provide to the network 130 that the second indicated TCI state/pair of TCI states in the set could be used/applied for PDCCH reception, when/if the 2-bit indicator(s) discussed herein is set to '10' ('00', '01' or '11'), the UE 116 could or may indicate/provide to the network 130 that the first and the second indicated TCI states/pairs of TCI states in the set could be respectively used/applied for receiving a first PDCCH and a second PDCCH, when/if the 2-bit indicator(s) discussed herein is set to '11' ('00', '01' or '10'), the UE 116 could or may indicate/provide to the network 130 that the second and the first indicated TCI states/pairs of TCI states in the set could be respectively used/applied for receiving a first PDCCH and a second PDCCH, wherein the first and second PDCCHs or PDCCH candidates could be received in search space sets (or CORESETs) higher layer configured with SearchSpaceLinking.

For another example, the indicator(s) discussed herein could correspond to a two-bit indicator—e.g., when a set of two joint/DL/UL TCI states or pairs of TCI states are indicated via MAC CE or DCI as specified herein in the disclosure. When/if the 2-bit indicator(s) discussed herein is set to '00' ('01', '10' or '11') or 'first', the UE 116 could or may indicate/provide to the network 130 that the first indicated TCI state/pair of TCI states in the set could be used/applied for PDCCH reception, when/if the 2-bit indicator(s) discussed herein is set to '01' ('00', '10' or '11') or 'second', the UE 116 could or may indicate/provide to the network 130 that the second indicated TCI state/pair of TCI states in the set could be used/applied for PDCCH reception, when/if the 2-bit indicator(s) discussed herein is set to '10' ('00', '01' or '11') or 'both', the UE 116 could or may indicate/provide to the network 130 that the first and the second indicated TCI states/pairs of TCI states in the set could be respectively used/applied for receiving a first PDCCH and a second PDCCH, when/if the 2-bit indicator(s) discussed herein is set to '11' ('00', '01' or '10') or 'both', the UE 116 could or may indicate/provide to the network 130 that the second and the first indicated TCI states/pairs of TCI states in the set could be respectively used/applied for receiving a first PDCCH and a second PDCCH, wherein the first and second PDCCHs or PDCCH candidates could be received in search space sets (or CORESETs) higher layer configured with SearchSpaceLinking. Optionally, when/if the 2-bit indicator(s) discussed herein is set to '11' ('00', '01' or '10') or 'none', the UE 116 could or may indicate/provide to the network 130 that none of the first and second indicated TCI states/pairs of TCI states in the set could be used/applied for receiving either the first PDCCH or the second PDCCH as specified above/herein in the present disclosure; for this case, the UE 116 could apply/use the TCI state(s) activated/indicated in a MAC CE beam activation/indication command associated to/for the corresponding CORESET(s) to receive the first and/or second PDCCH(s).

The design examples for PDCCH reception(s) as specified herein in the present disclosure could be applicable to one or more of the followings:

When the UE 116 is provided in PDCCH-Config two values of coresetPoolIndex (e.g., 0 and 1) for the corresponding CORESET(s), or is not provided coresetPoolIndex 0 for one or more first CORESETs but is provided coresetPoolIndex 1 for one or more second CORESETs; for this case, the indicator(s) sent by the UE 116 as specified herein in the present disclosure may not indicate/provide to the network 130 (or the network 130 does not expect/assume or is not expected) that both of the first indicated TCI state(s)—e.g., specific to coresetPoolIndex value 0—and the second indicated TCI state(s)—e.g., specific to coresetPoolIndex 1—could be used/applied for PDCCH reception(s).

When the UE 116 is not provided any coresetPoolIndex value(s), e.g., in PDCCH-Config or ControlResourceSet that configures the corresponding CORESET In one example, whether or not a beam/CSI report—sent by the UE 116—is a group-based or a non-group-based report could also provide/indicate—to the network 130—the same NW and/or UE behaviors/operations as the one or more indicators as specified herein in the present disclosure. That is, whether or not a beam/CSI report—sent by the UE 116—is a group-based or a non-group-based report could provide/indicate to the network 130 to turn/switch on/off one or more of the indicated TCI states in the set for UE-dedicated transmission(s) and/or reception(s)—in this embodiment for PDCCH reception/monitoring.

For example, when/if a UE sends to the network 130 a group-based (beam) report as specified herein in the present disclosure, the group-based report—sent by the UE 116—could also indicate/provide to the network 130 that the first (or second) and second (or first) TCI states/pairs of TCI states indicated in the set could be respectively used/applied for receiving the first and second PDCCHs. When/if a UE sends to the network 130 a non-group-based (beam) report as specified herein in the present disclosure, the non-group-based report—sent by the UE 116—could also indicate/provide to the network 130 that the first or second TCI state or pair of TCI states indicated in the set could be used/applied for PDCCH reception/monitoring.

For another example, whether or not a beam/CSI report—sent by the UE 116—is a group-based (or non-group-based) report could correspond to the one-bit indicator as specified herein in the present disclosure. Sending a group-based (beam) report could correspond to setting the one-bit indicator as specified herein in the present disclosure as 0 (or 1) and sending a non-group-based (beam) report could correspond to setting the one-bit indicator as specified herein in the present disclosure as 1 (or 0).

In one embodiment, under the Rel-15/16 TCI framework, a UE could be indicated/provided by the network 130, e.g., by a TCI codepoint of a TCI field in a beam indication DCI, a set of one or more TCI states for PDSCH reception. Furthermore, as specified herein in the present disclosure, under the unified TCI framework, a UE could be indicated/provided by the network 130, e.g., in a beam indication MAC CE or via one or more TCI codepoints by one or more TCI fields in a beam indication DCI (e.g., DCI format 1_1 or 1_2 with or without DL assignment), a set of one or more TCI states for each UE-dedicated downlink and/or uplink data and control channels and signals, wherein a TCI state here could correspond to a joint TCI state, a separate DL TCI state or a separate UL TCI state. The UE 116 could send to the network 130 one or more indicators—e.g., in form of a (UE-initiated/triggered) beam/CSI report in its entirety or in part of a (UE-initiated/triggered) beam/CSI report as specified herein in the present disclosure—to indicate/provide to the network 130 to turn/switch on/off one or more of the indicated TCI states in the set for PDSCH reception (under the Rel-15/16 TCI framework or unified TCI framework). The indicator(s) discussed here (i.e., in this embodiment) could correspond to the indicator(s) specified herein in the present disclosure (e.g., according to one or more examples described herein) and also provide/indicate—to the network 130—same or similar NW and/or UE operations or behaviors as the indicator(s) specified herein in the present disclosure (e.g., according to one or more examples described herein).

- For example, the indicator(s) discussed herein could correspond to one or more TCI state IDs or indexes of one or more TCI states in the set of indicated TCI states.
- For another example, the indicator(s) discussed herein could indicate/provide to the network 130 that the first indicated TCI state/pair of TCI states in the set could be used/applied for PDSCH reception; e.g., the indicator (s) could correspond to TCI state ID(s) of the first TCI state(s) in the set or index(es) of the first TCI state(s) in the set; or the indicator(s) could be a one-bit indicator set to '0' or '1' indicating the above.
- For another example, the indicator(s) discussed herein could indicate/provide to the network 130 that the second indicated TCI state/pair of TCI states in the set could be used/applied for PDSCH reception; e.g., the indicator(s) could correspond to TCI state ID(s) of the second TCI state(s) in the set or index(es) of the second TCI state(s) in the set; or the indicator(s) could be a one-bit indicator set to '0' or '1' indicating the above.
- For another example, the indicator(s) discussed herein could indicate/provide to the network 130 that the both of the first and second indicated TCI states/pairs of TCI states in the set could be used/applied for PDSCH reception; e.g., the indicator(s) could correspond to TCI state IDs of the first and second TCI states in the set or indexes of the first and second TCI states in the set; or the indicator(s) could be a one-bit indicator set to '0' or '1' indicating the above.
- For another example, the indicator(s) discussed herein could correspond to a two-bit indicator—e.g., when a set of two joint/DL/UL TCI states or pairs of TCI states are indicated via MAC CE or DCI as specified herein in the disclosure. When/if the 2-bit indicator(s) discussed herein is set to '00' ('01', '10' or '11') or 'first', the UE 116 could or may indicate/provide to the network 130 that the first indicated TCI state/pair of TCI states in the set could be used/applied for PDSCH reception, when/if the 2-bit indicator(s) discussed herein is set to '01' ('00', '10' or '11') or 'second', the UE 116 could or may indicate/provide to the network 130 that the second indicated TCI state/pair of TCI states in the set could be used/applied for PDSCH reception, when/if the 2-bit indicator(s) discussed herein is set to '10' ('00', '01' or '11') or 'both', the UE 116 could or may indicate/provide to the network 130 that the first and the second indicated TCI states/pairs of TCI states in the set could be respectively used/applied for receiving a first PDSCH and a second PDSCH, when/if the 2-bit indicator(s) discussed herein is set to '11' ('00', '01' or '10') or 'both', the UE 116 could or may indicate/provide to the network 130 that the second and the first indicated TCI states/pairs of TCI states in the set could be respectively used/applied for receiving a first PDSCH and a second PDSCH, wherein the first and second PDSCHs could respectively correspond to two PDCCH transmission occasions or repetitions in time, frequency or spatial domains.

The design examples for PDSCH reception(s) as specified herein in the present disclosure could be applicable to one or more of the followings:

- When the UE 116 is provided in PDCCH-Config two values of coresetPoolIndex (e.g., 0 and 1) for the corresponding CORESET(s), or is not provided coresetPoolIndex 0 for one or more first CORESETs but is provided coresetPoolIndex 1 for one or more second CORESETs; for this case, the indicator(s) sent by the UE 116 as specified herein in the present disclosure may not indicate/provide to the network 130 (or the network 130 does not expect/assume or is not expected) that both of the first indicated TCI state(s)—e.g., specific to coresetPoolIndex value 0—and the second indicated TCI state(s)—e.g., specific to coresetPoolIndex 1—could be used/applied for PDSCH reception(s).
- When the UE 116 is not provided any coresetPoolIndex value(s), e.g., in PDCCH-Config or ControlResourceSet that configures the corresponding CORESET.

Furthermore, the PDSCH reception(s) as specified herein in the present disclosure could be scheduled or activated by DCI format(s) 1_0, 1_1 and/or 1_2. In addition, the PDSCH reception(s) as specified herein in the present disclosure could correspond to semi-persistent scheduled/scheduling (SPS) PDSCH(s).

In one example, whether or not a beam/CSI report—sent by the UE 116—is a group-based or a non-group-based report could also provide/indicate—to the network 130—the same NW and/or UE behaviors/operations as the one or more indicators as specified herein in the present disclosure. That is, whether or not a beam/CSI report—sent by the UE 116—is a group-based or a non-group-based report could provide/indicate to the network 130 to turn/switch on/off one or more of the indicated TCI states in the set for UE-dedicated transmission(s) and/or reception(s)—in this embodiment for PDSCH reception.

- For example, when/if a UE sends to the network 130 a group-based (beam) report as specified herein in the present disclosure, the group-based report—sent by the UE 116—could also indicate/provide to the network 130 that the first (or second) and second (or first) TCI states/pairs of TCI states indicated in the set could be respectively used/applied for receiving the first and second PDSCHs. When/if a UE sends to the network 130 a non-group-based (beam) report as specified herein in the present disclosure, the non-group-based report—sent by the UE 116—could also indicate/provide to the network 130 that the first or second TCI state or pair of TCI states indicated in the set could be used/applied for PDSCH reception.
- For another example, whether or not a beam/CSI report—sent by the UE 116—is a group-based (or non-group-based) report could correspond to the one-bit indicator as specified herein in the present disclosure. Sending a group-based (beam) report could correspond to setting the one-bit indicator as specified herein in the present disclosure as 0 (or 1) and sending a non-group-based (beam) report could correspond to setting the one-bit indicator as specified herein in the present disclosure as 1 (or 0).

In one embodiment, under the unified TCI framework, a UE 116 could be indicated/provided by the network 130, e.g., in a beam indication MAC CE or via one or more TCI codepoints by one or more TCI fields in a beam indication DCI (e.g., DCI format 1_1 or 1_2 with or without DL assignment), a set of one or more TCI states for all UE-dedicated downlink and/or uplink data and control channels and signals, wherein a TCI state here could correspond to a joint TCI state, a separate DL TCI state or a separate UL TCI state. The UE 116 could send to the network 130 one or more indicators—e.g., in form of a (UE-initiated/triggered) beam/CSI report in its entirety or in part of a (UE-initiated/triggered) beam/CSI report as specified herein in the present disclosure—to indicate/provide to the network 130 to turn/switch on/off one or more of the indicated TCI states in the set for PUCCH transmission. The indicator(s) discussed here (i.e., in this embodiment) could correspond to the indicator(s) specified herein in the present disclosure (e.g., those described in earlier design examples), and also provide/indicate—to the network 130—same or similar NW and/or UE 116 operations or behaviors as the indicator(s) specified herein in the present disclosure (e.g., those described in earlier design examples).

For example, the indicator(s) discussed herein could correspond to one or more TCI state IDs or indexes of one or more TCI states in the set of indicated TCI states.

For another example, the indicator(s) discussed herein could indicate/provide to the network 130 that the first indicated TCI state/pair of TCI states in the set could be used/applied for PUCCH transmission; e.g., the indicator(s) could correspond to TCI state ID(s) of the first TCI state(s) in the set or index(es) of the first TCI state(s) in the set; or the indicator(s) could be a one-bit indicator set to ‘0’ or ‘1’ indicating the above.

For another example, the indicator(s) discussed herein could indicate/provide to the network 130 that the second indicated TCI state/pair of TCI states in the set could be used/applied for PUCCH transmission; e.g., the indicator(s) could correspond to TCI state ID(s) of the second TCI state(s) in the set or index(es) of the second TCI state(s) in the set; or the indicator(s) could be a one-bit indicator set to ‘0’ or ‘1’ indicating the above.

For another example, the indicator(s) discussed herein could indicate/provide to the network 130 that the both of the first and second indicated TCI states/pairs of TCI states in the set could be used/applied for PUCCH transmission; e.g., the indicator(s) could correspond to TCI state IDs of the first and second TCI states in the set or indexes of the first and second TCI states in the set; or the indicator(s) could be a one-bit indicator set to ‘0’ or ‘1’ indicating the above.

For another example, the indicator(s) discussed herein could correspond to a two-bit indicator—e.g., when a set of two joint/DL/UL TCI states or pairs of TCI states are indicated via MAC CE or DCI as specified herein in the disclosure. When/if the 2-bit indicator(s) discussed herein is set to ‘00’ (‘01’, ‘10’ or ‘11’) or ‘first’, the UE 116 could or may indicate/provide to the network 130 that the first indicated TCI state/pair of TCI states in the set could be used/applied for PUCCH transmission, when/if the 2-bit indicator(s) discussed herein is set to ‘01’ (‘00’, ‘10’ or ‘11’) or ‘second’, the UE 116 could or may indicate/provide to the network 130 that the second indicated TCI state/pair of TCI states in the set could be used/applied for PUCCH transmission, when/if the 2-bit indicator(s) discussed herein is set to ‘10’ (‘00’, ‘01’ or ‘11’) or ‘both’, the UE 116 could or may indicate/provide to the network 130 that the first and the second indicated TCI states/pairs of TCI states in the set could be respectively used/applied for transmitting a first PUCCH and a second PUCCH, when/if the 2-bit indicator(s) discussed herein is set to ‘11’ (‘00’, ‘01’ or ‘10’) or ‘both’, the UE 116 could or may indicate/provide to the network 130 that the second and the first indicated TCI states/pairs of TCI states in the set could be respectively used/applied for transmitting a first PUCCH and a second PUCCH, wherein the first and second PUCCHs could respectively correspond to two PUCCH transmission occasions or repetitions in time, frequency or spatial domains.

The design examples for PUCCH transmission(s) as specified herein in the present disclosure could be applicable to one or more of the followings:

When the UE 116 is provided in PDCCH-Config two values of coresetPoolIndex (e.g., 0 and 1) for the corresponding CORESET(s), or is not provided coresetPoolIndex 0 for one or more first CORESETs but is provided coresetPoolIndex 1 for one or more second CORESETs; for this case, the indicator(s) sent by the UE 116 as specified herein in the present disclosure may not indicate/provide to the network 130 (or the network 130 does not expect/assume or is not expected) that both of the first indicated TCI state(s)—e.g., specific to coresetPoolIndex value 0—and the second indicated TCI state(s)—e.g., specific to coresetPoolIndex 1—could be used/applied for PUCCH transmission(s).

When the UE 116 is not provided any coresetPoolIndex value(s), e.g., in PDCCH-Config or ControlResource Set that configures the corresponding CORESET.

Furthermore, the PUCCH transmission(s) as specified herein in the present disclosure could be periodic, semi-persistent or aperiodic PUCCH transmission(s).

In one example, whether or not a beam/CSI report—sent by the UE 116—is a group-based or a non-group-based report could also provide/indicate—to the network 130—the same NW 130 and/or UE 116 behaviors/operations as the one or more indicators as specified herein in the present disclosure. That is, whether or not a beam/CSI report—sent by the UE 116—is a group-based or a non-group-based report could provide/indicate to the network 130 to turn/switch on/off one or more of the indicated TCI states in the set for UE-dedicated transmission(s) and/or reception(s)—in this embodiment, for PUCCH transmission.

For example, when/if a UE 116 sends to the network 130 a group-based (beam) report as specified herein in the present disclosure, the group-based report—sent by the UE 116—could also indicate/provide to the network 130 that the first (or second) and second (or first) TCI states/pairs of TCI states indicated in the set could be respectively used/applied for transmitting the first and second PUCCHs. When/if a UE 116 sends to the network 130 a non-group-based (beam) report as specified herein in the present disclosure, the non-group-based report—sent by the UE 116—could also indicate/provide to the network 130 that the first or second TCI state or pair of TCI states indicated in the set could be used/applied for PUCCH transmission.

For another example, whether or not a beam/CSI report—sent by the UE 116—is a group-based (or non-group-based) report could correspond to the one-bit indicator as specified herein in the present disclosure. Sending a group-based (beam) report could correspond to setting the one-bit indicator as specified herein in the present disclosure as 0 (or 1), and sending a non-group-based (beam) report could correspond to setting the one-bit indicator as specified herein in the present disclosure as 1 (or 0).

In one embodiment, under the unified TCI framework, a UE could be indicated/provided by the network 130, e.g., in a beam indication MAC CE or via one or more TCI codepoints by one or more TCI fields in a beam indication DCI (e.g., DCI format 1_1 or 1_2 with or without DL assignment), a set of one or more TCI states for each UE-dedicated downlink and/or uplink data and control channels and signals, wherein a TCI state here could correspond to a joint TCI state, a separate DL TCI state, or a separate UL TCI state. The UE 116 could send to the network 130 one or more indicators—e.g., in form of a (UE-initiated/triggered) beam/CSI report in its entirety or in part of a (UE-initiated/triggered) beam/CSI report as specified herein in the present disclosure—to indicate/provide to the network 130 to turn/switch on/off one or more of the indicated TCI states in the set for PUSCH transmission. The indicator(s) discussed here (i.e., in this embodiment) could correspond to the indicator(s) specified herein in the present disclosure (e.g., according to one or more examples described herein) and also provide/indicate—to the network 130—same or similar NW and/or UE operations or behaviors as the indicator(s) specified herein in the present disclosure (e.g., according to one or more examples described herein).

- For example, the indicator(s) discussed herein could correspond to one or more TCI state IDs or indexes of one or more TCI states in the set of indicated TCI states.
- For another example, the indicator(s) discussed herein could indicate/provide to the network 130 that the first indicated TCI state/pair of TCI states in the set could be used/applied for PUSCH transmission (e.g., all PUSCH transmission occasions/antenna ports); e.g., the indicator(s) could correspond to TCI state ID(s) of the first TCI state(s) in the set or index(es) of the first TCI state(s) in the set; or the indicator(s) could be a one-bit indicator set to ‘0’ or ‘1’ indicating the above.
- For another example, the indicator(s) discussed herein could indicate/provide to the network 130 that the second indicated TCI state/pair of TCI states in the set could be used/applied for PUSCH transmission (e.g., all PUSCH transmission occasions/antenna ports); e.g., the indicator(s) could correspond to TCI state ID(s) of the second TCI state(s) in the set or index(es) of the second TCI state(s) in the set; or the indicator(s) could be a one-bit indicator set to ‘0’ or ‘1’ indicating the above.
- For another example, the indicator(s) discussed herein could indicate/provide to the network 130 that the both of the first and second indicated TCI states/pairs of TCI states in the set could be used/applied for PUSCH transmission (e.g., all PUSCH transmission occasions/antenna ports); e.g., the indicator(s) could correspond to TCI state IDs of the first and second TCI states in the set or indexes of the first and second TCI states in the set; or the indicator(s) could be a one-bit indicator set to ‘0’ or ‘1’ indicating the above.
- For another example, the indicator(s) discussed herein could correspond to a two-bit indicator—e.g., when a set of two joint/DL/UL TCI states or pairs of TCI states are indicated via MAC CE or DCI as specified herein in the disclosure and/or two SRS resource sets comprising a first SRS resource set and a second SRS resource set are configured in srs-ResourceSetToAddModList or srs-ResourceSetToAddModListDCI-0-2 with higher layer parameter usage in SRS-ResourceSet set to ‘codebook’ or ‘noncodebook’. When/if the 2-bit indicator(s) discussed herein is set to ‘00’ (‘01’, ‘10’ or ‘11’) or ‘first’, the UE 116 could or may indicate/provide to the network 130 that the first indicated TCI state/pair of TCI states in the set could be used/applied for PUSCH transmission (or PUSCH transmission occasion(s)/antenna port(s) associated with the first SRS resource set), when/if the 2-bit indicator(s) discussed herein is set to ‘01’ (‘00’, ‘10’ or ‘11’) or ‘second’, the UE 116 could or may indicate/provide to the network 130 that the second indicated TCI state/pair of TCI states in the set could be used/applied for PUSCH transmission (or PUSCH transmission occasion(s)/antenna port(s) associated with the second SRS resource set), when/if the 2-bit indicator(s) discussed herein is set to ‘10’ (‘00’, ‘01’ or ‘11’) or ‘both’, the UE 116 could or may indicate/provide to the network 130 that the first and the second indicated TCI states/pairs of TCI states in the set could be respectively used/applied for transmitting a first PUSCH (or first PUSCH transmission occasion(s)/antenna port(s) associated with the first SRS resource set) and a second PUSCH (or second PUSCH transmission occasion(s)/antenna port(s) associated with the second SRS resource set), when/if the 2-bit indicator(s) discussed herein is set to ‘11’ (‘00’, ‘01’ or ‘10’) or ‘both’, the UE 116 could or may indicate/provide to the network 130 that the second and the first indicated TCI states/pairs of TCI states in the set could be respectively used/applied for transmitting a first PUSCH (or first PUSCH transmission occasion(s)/antenna port(s) associated with the first SRS resource set) and a second PUSCH (or second PUSCH transmission occasion(s)/antenna port(s) associated with the second SRS resource set), wherein the first and second PUSCHs could respectively correspond to two PUSCH transmission occasions or repetitions or antenna ports in time, frequency or spatial domains, and/or associated with two SRS resource sets respectively according to those specified herein in the present disclosure.

The design examples for PUSCH transmission(s) as specified herein in the present disclosure could be applicable to one or more of the followings:

- When the UE 116 is provided in PDCCH-Config two values of coresetPoolIndex (e.g., 0 and 1) for the corresponding CORESET(s), or is not provided coresetPoolIndex 0 for one or more first CORESETs but is provided coresetPoolIndex 1 for one or more second CORESETs; for this case, the indicator(s) sent by the UE 116 as specified herein in the present disclosure may not indicate/provide to the network 130 (or the network 130 does not expect/assume or is not expected) that both of the first indicated TCI state(s)—e.g., specific to coresetPoolIndex value 0—and the second indicated TCI state(s)—e.g., specific to coresetPoolIndex 1—could be used/applied for PUSCH transmission(s).
- When the UE 116 is not provided any coresetPoolIndex value(s), e.g., in PDCCH-Config or ControlResourceSet that configures the corresponding CORESET.

Furthermore, the PUSCH transmission(s) as specified herein in the present disclosure could be scheduled or activated by DCI format(s) 0_0, 0_1 and/or 0_2. In addition, the PUSCH transmission(s) as specified herein in the present disclosure could correspond to Type-1 configured grant (CG) PUSCH transmission(s), Type-2 CG PUSCH transmission(s) and/or dynamic grant (DG) PUSCH transmission (s).

In one example, whether or not a beam/CSI report—sent by the UE 116—is a group-based or a non-group-based report could also provide/indicate—to the network 130—the same NW and/or UE behaviors/operations as the one or more indicators as specified herein in the present disclosure. That is, whether or not a beam/CSI report—sent by the UE 116—is a group-based or a non-group-based report could provide/indicate to the network 130 to turn/switch on/off one or more of the indicated TCI states in the set for UE-dedicated transmission(s) and/or reception(s)—in this embodiment for PUSCH transmission.

For example, when/if a UE sends to the network 130 a group-based (beam) report as specified herein in the present disclosure, the group-based report—sent by the UE 116—could also indicate/provide to the network 130 that the first (or second) and second (or first) TCI states/pairs of TCI states indicated in the set could be respectively used/applied for transmitting the first and second PUSCHs. When/if a UE sends to the network 130 a non-group-based (beam) report as specified herein in the present disclosure, the non-group-based report—sent by the UE 116—could also indicate/provide to the network 130 that the first or second TCI state or pair of TCI states indicated in the set could be used/applied for PUSCH transmission.

For another example, whether or not a beam/CSI report—sent by the UE 116—is a group-based (or non-group-based) report could correspond to the one-bit indicator as specified herein in the present disclosure. Sending a group-based (beam) report could correspond to setting the one-bit indicator as specified herein in the present disclosure as 0 (or 1) and sending a non-group-based (beam) report could correspond to setting the one-bit indicator as specified herein in the present disclosure as 1 (or 0).

Figure 7:
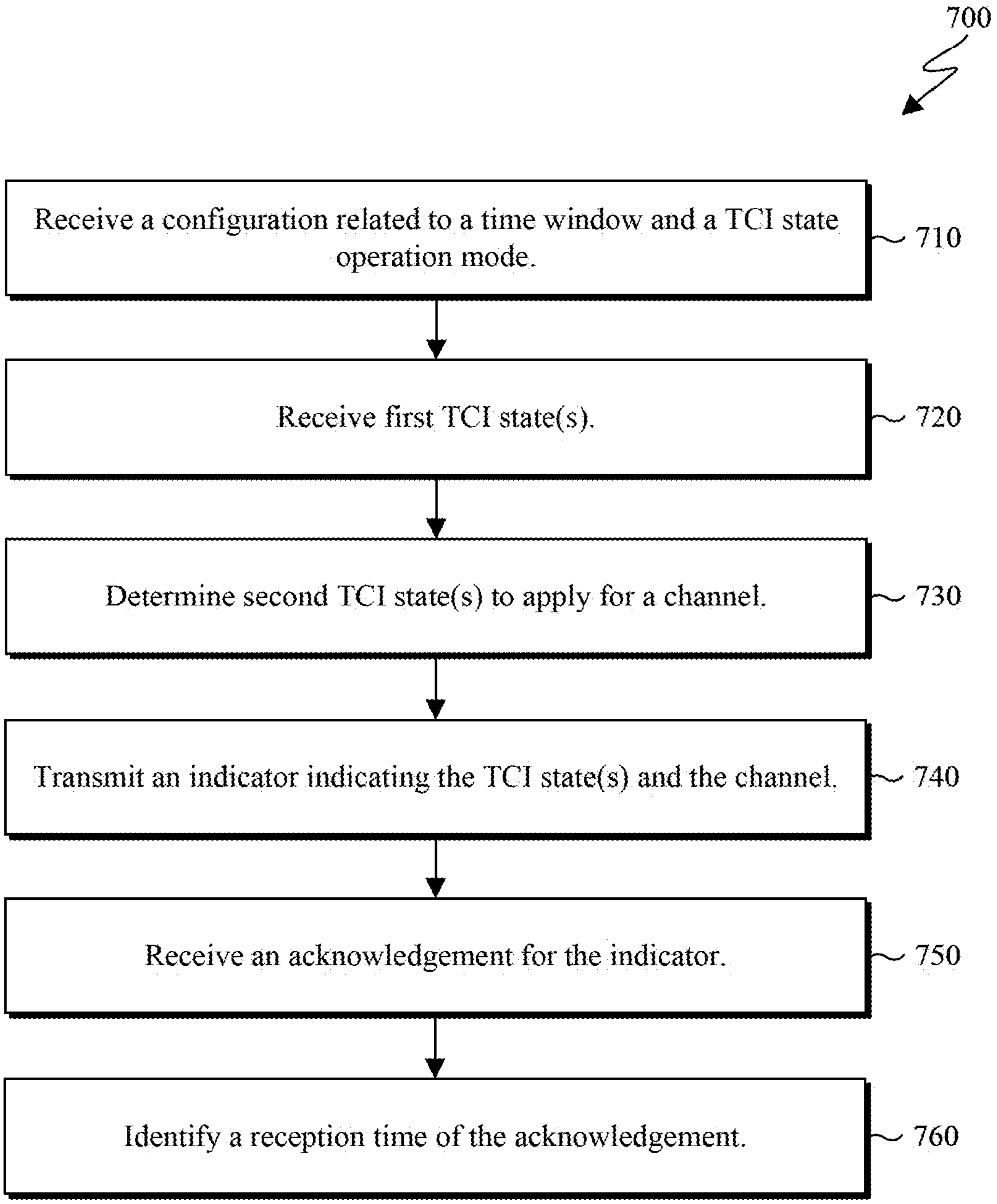
FIG. 7 illustrates an example method performed by a UE in a wireless communication system according to embodiments of the present disclosure.

FIG. 7 illustrates an example method 700 performed by a UE in a wireless communication system according to embodiments of the present disclosure. The method 700 of FIG. 7 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 700 is for illustration only and other embodiments can be used without departing from the scope of the present disclosure.

The method 700 begins with the UE receiving a configuration related to a time window and a TCI state operation mode (710). The UE then receives first TCI state(s) (720). The UE then determines second TCI state(s) to apply for a channel (730). For example, in 730, the UE may determine the second TCI state(s) based on the configuration and the first TCI state(s) where these second TCI state(s) are from the first TCI state(s). In various embodiments, the channel comprises at least one of: one or more PDCCHs, one or more PDSCHs, one or more PUCCHs, and one or more PUSCHs.

The UE then transmits an indicator indicating the TCI state(s) and the channel (740). In various embodiments, the first TCI state(s) include a first TCI state and a second TCI state, the channel includes a first PDCCH and a second PDCCH, and the indicator is a two-bit indicator. In these embodiments, a value '00' of the two-bit indicator indicates that the second TCI state(s) correspond to the first TCI state and apply to both the first and second PDCCHs; a value '01' of the two-bit indicator indicates that the second TCI state(s) correspond to the second TCI state and apply to both the first and second PDCCHs; a value '10' of the two-bit indicator indicates that the second TCI state(s) correspond to the first and second TCI states and apply to the first and second PDCCHs, respectively; and a value '11' of the two-bit indicator indicates that the second TCI state(s) correspond to neither of the first and second TCI states.

In various embodiments, the first TCI state(s) includes a first TCI state and a second TCI state, the channel comprises a first PDSCH and a second PDSCH, the indicator is a two-bit indicator, In these embodiments, a value '00' of the two-bit indicator indicates that the second TCI state(s) correspond to the first TCI state and apply to both the first and second PDSCHs; a value '01' of the two-bit indicator indicates that the second TCI state(s) correspond to the second TCI state and apply to both the first and second PDSCHs; a value '10' of the two-bit indicator indicates that the second TCI state(s) correspond to both the first and second TCI states and apply to the first and second PDSCHs, respectively; and a value '11' of the two-bit indicator indicates that the second TCI state(s) correspond to neither of the first and second TCI states.

The UE then receives an acknowledgement for the indicator (750). For example, in 750, the indicator is TCI IDs of the second TCI state(s) or indexes of the second TCI state(s).

The UE then identifies a reception time of the acknowledgement (760). For example, in 760, the reception time is determined relative to the transmission of the indicator. In various embodiments, when the reception time is outside of the time window, the UE re-transmits the indicator. In various embodiments, when the reception time is outside of the time window, the UE applies the first TCI state(s) to the channel; and, when the reception time is within the time window, the UE applies the second TCI state(s) to the channel.

Any of the above variation embodiments can be utilized independently or in combination with at least one other variation embodiment.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed:

1. A user equipment (UE), comprising:

a transceiver configured to:

receive a configuration related to (i) one or more first transmission configuration indication (TCI) states, and (ii) a time window; and receive one or more first TCI states; and a processor operably coupled to the transceiver, the processor configured to determine one or more second TCI states, from the one or more first TCI states, to apply for a channel;

wherein the transceiver is further configured to:

transmit an indicator indicating the one or more second TCI states; and receive an acknowledgement for the indicator; and wherein the processor is further configured to identify a reception time of the acknowledgement, wherein when the reception time is outside of the time window, the processor is further configured to apply the one or more first TCI states to the channel, and wherein when the reception time is within the time window, the processor is further configured to apply the one or more second TCI states to the channel.

2. The UE of claim 1, wherein the reception time is relative to the transmission of the indicator.

3. The UE of claim 1, wherein, when the reception time is outside of the time window, the transceiver is further configured to re-transmit the indicator.

4. The UE of claim 1, wherein the channel comprises at least one of: one or more physical downlink control channels (PDCCHs), one or more physical downlink shared channels (PDSCHs), one or more physical uplink control channels (PUCCHs), and one or more physical uplink shared channels (PUSCHs).

5. The UE of claim 1, wherein the indicator is one of:

TCI state identities (IDs) of the one or more second TCI states; and indexes of the one or more second TCI states.

6. The UE of claim 1, wherein:

the one or more first TCI states include a first TCI state and a second TCI state, the channel includes a first physical downlink control channel (PDCCH) and a second PDCCH, the indicator is a two-bit indicator, a value '00' of the two-bit indicator indicates that the one or more second TCI states correspond to the first TCI state and apply to both the first and second PDCCHs;

a value '01' of the two-bit indicator indicates that the one or more second TCI states correspond to the second TCI state and apply to both the first and second PDCCHs;

a value '10' of the two-bit indicator indicates that the one or more second TCI states correspond to the first and second TCI states and apply to the first and second PDCCHs, respectively; and a value '11' of the two-bit indicator indicates that the one or more second TCI states correspond to neither of the first and second TCI states.

7. The UE of claim 1, wherein:

the one or more first TCI states includes a first TCI state and a second TCI state, the channel comprises a first physical downlink shared channel (PDSCH) and a second PDSCH, the indicator is a two-bit indicator, a value '00' of the two-bit indicator indicates that the one or more second TCI states correspond to the first TCI state and apply to both the first and second PDSCHs;

a value '01' of the two-bit indicator indicates that the one or more second TCI states correspond to the second TCI state and apply to both the first and second PDSCHs;

a value '10' of the two-bit indicator indicates that the one or more second TCI states correspond to both the first and second TCI states and apply to the first and second PDSCHs, respectively; and a value '11' of the two-bit indicator indicates that the one or more second TCI states correspond to neither of the first and second TCI states.

8. A base station (BS), comprising:

a processor; and a transceiver operably coupled to the processor, the transceiver configured to:

transmit a configuration related to (i) one or more first transmission configuration indication (TCI) states, and (ii) a time window;

transmit the one or more first TCI states;

receive an indicator indicating one or more second TCI states, from the one or more first TCI states, to apply for a channel;

transmit an acknowledgement for the indicator, when a reception time of the acknowledgement is outside of the time window, the one or more first TCI states apply for the channel; and when the reception time is within the time window, the one or more second TCI states apply for the channel.

9. The BS of claim 8, wherein a reception time of the acknowledgement is relative to a transmission of the indicator.

10. The BS of claim 8, wherein, when a reception time of the acknowledgement is outside of the time window, the transceiver is further configured to re-receive the indicator.

11. The BS of claim 8, wherein the channel comprises at least one of: one or more physical downlink control channels (PDCCHs), one or more physical downlink shared channels (PDSCHs), one or more physical uplink control channels (PUCCHs), and one or more physical uplink shared channels (PUSCHs).

12. The BS of claim 8, wherein the indicator is one of:

TCI state identities (IDs) of the one or more second TCI states; and indexes of the one or more second TCI states.

13. The BS of claim 8, wherein:

the one or more first TCI states include a first TCI state and a second TCI state, the channel includes a first physical downlink control channel (PDCCH) and a second PDCCH, the indicator is a two-bit indicator, a value '00' of the two-bit indicator indicates that the one or more second TCI states correspond to the first TCI state and apply to both the first and second PDCCHs;

a value '01' of the two-bit indicator indicates that the one or more second TCI states correspond to the second TCI state and apply to both the first and second PDCCHs;

a value '10' of the two-bit indicator indicates that the one or more second TCI states correspond to the first and second TCI states and apply to the first and second PDCCHs, respectively; and a value '11' of the two-bit indicator indicates that the one or more second TCI states correspond to neither of the first and second TCI states.

14. The BS of claim 8, wherein:

the one or more first TCI states includes a first TCI state and a second TCI state, the channel comprises a first physical downlink shared channel (PDSCH) and a second PDSCH, the indicator is a two-bit indicator, a value '00' of the two-bit indicator indicates that the one or more second TCI states correspond to the first TCI state and apply to both the first and second PDSCHs;

a value '01' of the two-bit indicator indicates that the one or more second TCI states correspond to the second TCI state and apply to both the first and second PDSCHs;

a value '10' of the two-bit indicator indicates that the one or more second TCI states correspond to both the first and second TCI states and apply to the first and second PDSCHs, respectively; and a value '11' of the two-bit indicator indicates that the one or more second TCI states correspond to neither of the first and second TCI states.

15. A method performed by a user equipment (UE), the method comprising:

receiving a configuration related to (i) one or more first transmission configuration indication (TCI) states, and (ii) a time window;

receiving one or more first TCI states;

determining one or more second TCI states, from the one or more first TCI states, to apply for a channel;

transmitting an indicator indicating the one or more second TCI states;

receiving an acknowledgement for the indicator;

identifying a reception time of the acknowledgement;

when the reception time is outside of the time window, applying the one or more first TCI states to the channel; and when the reception time is within the time window, applying the one or more second TCI states to the channel.

16. The method of claim 15, wherein the reception time is relative to the transmission of the indicator.

17. The method of claim 15, further comprising, in response to identifying that the reception time is outside of the time window, re-transmitting the indicator.

18. The method of claim 15, wherein the channel comprises at least one of: one or more physical downlink control channels (PDCCHs), one or more physical downlink shared channels (PDSCHs), one or more physical uplink control channels (PUCCHs), and one or more physical uplink shared channels (PUSCHs).

19. The method of claim 15, wherein the indicator is one of:

TCI state identities (IDs) of the one or more second TCI states; and indexes of the one or more second TCI states.

20. The method of claim 15, wherein:

the one or more first TCI states include a first TCI state and a second TCI state, the channel includes a first physical downlink control channel (PDCCH) and a second PDCCH, the indicator is a two-bit indicator, a value '00' of the two-bit indicator indicates that the one or more second TCI states correspond to the first TCI state and apply to both the first and second PDCCHs;

a value '01' of the two-bit indicator indicates that the one or more second TCI states correspond to the second TCI state and apply to both the first and second PDCCHs;

a value '10' of the two-bit indicator indicates that the one or more second TCI states correspond to the first and second TCI states and apply to the first and second PDCCHs, respectively; and a value '11' of the two-bit indicator indicates that the one or more second TCI states correspond to neither of the first and second TCI states.

* * * * *